United States Patent
Jackson et al.

(10) Patent No.: US 10,873,798 B1
(45) Date of Patent: Dec. 22, 2020

(54) DETECTING THROUGH-BODY INPUTS AT A WEARABLE AUDIO DEVICE

(71) Applicant: Apple Inc., Cupertino, CA (US)

(72) Inventors: Benjamin G. Jackson, Belmont, CA (US); Brenton A. Baugh, Los Altos Hills, CA (US); David H. Bloom, San Francisco, CA (US); Gemma A. Roper, San Francisco, CA (US); Karlin Y. Bark, Menlo Park, CA (US); Thomas S. Hulbert, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/055,068

(22) Filed: Aug. 4, 2018

Related U.S. Application Data

(60) Provisional application No. 62/683,571, filed on Jun. 11, 2018.

(51) Int. Cl.
| | | |
|---|---|---|
| *H04R 5/033* | (2006.01) | |
| *H04R 1/10* | (2006.01) | |
| *H04R 1/46* | (2006.01) | |
| *G06F 3/01* | (2006.01) | |

(52) U.S. Cl.
CPC ........... *H04R 1/1016* (2013.01); *G06F 3/011* (2013.01); *G06F 3/017* (2013.01); *H04R 1/46* (2013.01)

(58) Field of Classification Search
CPC ..... H04R 5/04; H04R 1/1075; H04M 1/6058; H04M 2250/22
USPC .......................................... 381/312, 328, 74
See application file for complete search history.

(56) References Cited

U.S. PATENT DOCUMENTS

| | | |
|---|---|---|
| 1,276,708 A | 8/1918 | Blair |
| 1,646,628 A | 10/1927 | Nolen |
| 1,893,291 A | 1/1933 | Kwartin |
| 1,992,605 A | 2/1935 | Clifford et al. |

(Continued)

FOREIGN PATENT DOCUMENTS

| | | |
|---|---|---|
| CN | 204104134 | 1/2015 |
| EP | 2094032 | 8/2009 |

(Continued)

OTHER PUBLICATIONS

Valdes et al., "How Smart Watches Work," https://electronics.howstuffworks.com/gadgets/clocks-watches/smart-watch2.htm, 10 pages, Apr. 2005.

(Continued)

*Primary Examiner* — George C Monikang
(74) *Attorney, Agent, or Firm* — Brownstein Hyatt Farber Schreck, LLP

(57) ABSTRACT

The present disclosure describes systems, devices, and techniques related to a wearable audio device, such as an earbud or other device that is configured to detect inputs and change the operation of the wearable audio device in accordance with the inputs. In some embodiments, the wearable audio device is disposed in a structure and detects signals propagating through or within the structure. Various inputs may cause one or more signals to propagate through or within the structure, outside the structure, or some combination thereof. The wearable audio device may determine whether a detected signal was generated by an input and, if so, change its operation in accordance with the input.

15 Claims, 13 Drawing Sheets

(56) References Cited

U.S. PATENT DOCUMENTS

| | | |
|---|---|---|
| 2,325,688 A | 7/1943 | Landis |
| 2,779,095 A | 1/1957 | Hottenroth, Jr. |
| 3,414,689 A | 12/1968 | Gummel et al. |
| 3,866,299 A | 2/1975 | Gregg et al. |
| 4,068,103 A | 1/1978 | King et al. |
| 4,081,631 A | 3/1978 | Feder |
| 4,089,576 A | 5/1978 | Barchet |
| 4,095,411 A | 6/1978 | Kondo |
| 4,132,437 A | 1/1979 | Green |
| 4,245,642 A | 1/1981 | Skubitz et al. |
| 4,466,441 A | 8/1984 | Skubitz et al. |
| 4,658,425 A | 4/1987 | Julstrom |
| 5,106,318 A | 4/1992 | Endo et al. |
| 5,293,002 A | 3/1994 | Grenet et al. |
| 5,335,011 A | 8/1994 | Addeo et al. |
| 5,341,433 A | 8/1994 | Meyer et al. |
| 5,406,038 A | 4/1995 | Reiff et al. |
| 5,521,886 A | 5/1996 | Hirosawa et al. |
| 5,570,324 A | 10/1996 | Geil |
| 5,604,329 A | 2/1997 | Kressner et al. |
| 5,619,583 A | 4/1997 | Page et al. |
| 5,733,153 A | 3/1998 | Takahashi et al. |
| 5,879,598 A | 3/1999 | McGrane |
| 5,958,203 A | 9/1999 | Parce et al. |
| 5,960,366 A | 9/1999 | Duwaer |
| 6,036,554 A | 3/2000 | Koeda et al. |
| 6,073,033 A | 6/2000 | Campo |
| 6,129,582 A | 10/2000 | Wilhite et al. |
| 6,151,401 A | 11/2000 | Annaratone |
| 6,154,551 A | 11/2000 | Frenkel |
| 6,191,796 B1 | 2/2001 | Tarr |
| 6,192,253 B1 | 2/2001 | Charlier et al. |
| 6,317,237 B1 | 11/2001 | Nakao et al. |
| 6,370,005 B1 | 4/2002 | Sun et al. |
| 6,400,825 B1 | 6/2002 | Miyamoto et al. |
| 6,516,077 B1 | 2/2003 | Yamaguchi et al. |
| 6,553,126 B2 | 4/2003 | Han et al. |
| 6,700,987 B2 | 3/2004 | Kuze et al. |
| 6,754,359 B1 | 6/2004 | Svean et al. |
| 6,813,218 B1 | 11/2004 | Antonelli et al. |
| 6,829,018 B2 | 12/2004 | Lin et al. |
| 6,882,335 B2 | 4/2005 | Saarinen |
| 6,892,850 B2 | 5/2005 | Suzuki et al. |
| 6,924,792 B1 | 8/2005 | Jessop |
| 6,934,394 B1 | 8/2005 | Anderson |
| 6,942,771 B1 | 9/2005 | Kayyem |
| 7,003,099 B1 | 2/2006 | Zhang et al. |
| 7,059,932 B1 | 6/2006 | Tobias et al. |
| 7,082,322 B2 | 7/2006 | Harano |
| 7,116,795 B2 | 10/2006 | Tuason et al. |
| 7,154,526 B2 | 12/2006 | Foote et al. |
| 7,158,647 B2 | 1/2007 | Azima et al. |
| 7,181,030 B2 | 2/2007 | Rasmussen et al. |
| 7,263,373 B2 | 8/2007 | Mattisson |
| 7,266,189 B1 | 9/2007 | Day |
| 7,362,877 B2 | 4/2008 | Honda et al. |
| 7,378,963 B1 | 5/2008 | Begault et al. |
| 7,414,922 B2 | 8/2008 | Ferri et al. |
| 7,527,523 B2 | 5/2009 | Yohn et al. |
| 7,536,029 B2 | 5/2009 | Choi et al. |
| 7,570,772 B2 | 8/2009 | Sorensen et al. |
| 7,679,923 B2 | 3/2010 | Inagaki et al. |
| 7,792,320 B2 | 9/2010 | Proni |
| 7,867,001 B2 | 1/2011 | Ambo et al. |
| 7,878,869 B2 | 2/2011 | Murano et al. |
| 7,903,061 B2 | 3/2011 | Zhang et al. |
| 7,912,242 B2 | 3/2011 | Hikichi |
| 7,966,785 B2 | 6/2011 | Zadesky et al. |
| 8,031,853 B2 | 10/2011 | Bathurst et al. |
| 8,055,003 B2 | 11/2011 | Mittleman et al. |
| 8,116,505 B2 | 2/2012 | Kawasaki-Hedges et al. |
| 8,116,506 B2 | 2/2012 | Kuroda et al. |
| 8,161,890 B2 | 4/2012 | Wang |
| 8,204,266 B2 | 6/2012 | Munoz et al. |
| 8,218,397 B2 | 7/2012 | Chan |
| 8,226,446 B2 | 7/2012 | Kondo et al. |
| 8,264,777 B2 | 9/2012 | Skipor et al. |
| 8,286,319 B2 | 10/2012 | Stolle et al. |
| 8,340,312 B2 | 12/2012 | Johnson et al. |
| 8,409,417 B2 | 4/2013 | Wu |
| 8,417,298 B2 | 4/2013 | Mittleman et al. |
| 8,447,054 B2 | 5/2013 | Bharatan et al. |
| 8,452,037 B2 | 5/2013 | Filson et al. |
| 8,488,817 B2 | 7/2013 | Mittleman et al. |
| 8,508,908 B2 | 8/2013 | Jewell-Larsen |
| 8,560,309 B2 | 10/2013 | Pance et al. |
| 8,574,004 B1 | 11/2013 | Tarchinski et al. |
| 8,620,162 B2 | 12/2013 | Mittleman |
| 8,632,670 B2 | 1/2014 | Garimella et al. |
| 8,644,519 B2 | 2/2014 | Pance et al. |
| 8,644,533 B2 | 2/2014 | Burns |
| 8,693,698 B2 | 4/2014 | Carnes et al. |
| 8,724,841 B2 | 5/2014 | Bright et al. |
| 8,804,993 B2 | 8/2014 | Shukla et al. |
| 8,811,648 B2 | 8/2014 | Pance et al. |
| 8,858,271 B2 | 10/2014 | Yeung et al. |
| 8,879,761 B2 | 11/2014 | Johnson et al. |
| 8,882,547 B2 | 11/2014 | Asakuma et al. |
| 8,983,097 B2 | 3/2015 | Dehe et al. |
| 8,989,428 B2 | 3/2015 | Kwong |
| 9,007,871 B2 | 4/2015 | Armstrong-Muntner |
| 9,066,172 B2 | 6/2015 | Dix et al. |
| 9,161,434 B2 | 10/2015 | Merz et al. |
| 9,227,189 B2 | 1/2016 | Sobek et al. |
| 9,229,494 B2 | 1/2016 | Rayner |
| 9,357,299 B2 | 5/2016 | Kwong |
| 9,380,369 B2 | 6/2016 | Utterman et al. |
| 9,386,362 B2 | 7/2016 | Filson et al. |
| 9,451,354 B2 | 9/2016 | Zadesky et al. |
| 9,497,527 B2 | 11/2016 | Mittleman et al. |
| 9,774,941 B2 | 9/2017 | Grinker |
| 9,820,033 B2 | 11/2017 | Dix et al. |
| 9,838,811 B2 | 12/2017 | Pelosi |
| 9,854,345 B2 | 12/2017 | Briggs |
| 9,857,262 B2 | 1/2018 | Kil et al. |
| 9,888,309 B2 | 2/2018 | Prelogar et al. |
| 9,900,698 B2 | 2/2018 | Luzzato et al. |
| 10,466,047 B2 | 11/2019 | Ehman et al. |
| 2003/0087292 A1 | 5/2003 | Chen et al. |
| 2004/0203520 A1 | 10/2004 | Schirtzinger et al. |
| 2005/0009004 A1 | 1/2005 | Xu et al. |
| 2005/0271216 A1 | 12/2005 | Lashkari |
| 2006/0072248 A1 | 4/2006 | Watanabe et al. |
| 2006/0233411 A1 | 10/2006 | Utigard |
| 2007/0012827 A1 | 1/2007 | Fu et al. |
| 2008/0204379 A1 | 8/2008 | Perez-Noguera |
| 2008/0260188 A1 | 10/2008 | Kim |
| 2008/0292112 A1 | 11/2008 | Valenzuela et al. |
| 2008/0292126 A1 | 11/2008 | Sacha et al. |
| 2008/0310663 A1 | 12/2008 | Shirasaka et al. |
| 2009/0045005 A1 | 2/2009 | Byon et al. |
| 2011/0002487 A1 | 1/2011 | Panther et al. |
| 2011/0211724 A1* | 9/2011 | Hirata ............ H04R 1/1016 381/384 |
| 2013/0164999 A1 | 6/2013 | Ge et al. |
| 2013/0280965 A1 | 10/2013 | Kojyo |
| 2014/0250657 A1 | 9/2014 | Stanley et al. |
| 2015/0078611 A1 | 3/2015 | Boozer et al. |
| 2015/0310846 A1* | 10/2015 | Andersen ............ H04R 1/22 381/71.6 |
| 2016/0150311 A1* | 5/2016 | Bremyer ............ H04R 1/1008 381/371 |
| 2016/0234585 A1 | 8/2016 | Filson et al. |
| 2016/0324478 A1 | 11/2016 | Goldstein |
| 2017/0026765 A1* | 1/2017 | Pelosi ............ H04R 1/1041 |
| 2017/0094386 A1 | 3/2017 | Trainer et al. |
| 2017/0180850 A1 | 6/2017 | Hsu et al. |
| 2017/0347179 A1 | 11/2017 | Masaki et al. |

(56) References Cited

U.S. PATENT DOCUMENTS

| | | | |
|---|---|---|---|
| 2018/0035217 A1* | 2/2018 | Han | H04R 1/1041 |
| 2019/0094973 A1 | 3/2019 | Miller et al. | |

FOREIGN PATENT DOCUMENTS

| GB | 2310559 | 8/1997 |
|---|---|---|
| GB | 2342802 | 4/2000 |
| JP | 2102905 | 4/1990 |
| JP | 2003319490 | 11/2003 |
| JP | 2004153018 | 5/2004 |
| JP | 2006297828 | 11/2006 |
| WO | WO03/049494 | 6/2003 |
| WO | WO04/025938 | 3/2004 |
| WO | WO2007/083894 | 7/2007 |
| WO | WO08/153639 | 12/2008 |
| WO | WO2009/017280 | 2/2009 |
| WO | WO2011/057346 | 5/2011 |
| WO | WO2011/061483 | 5/2011 |
| WO | WO2016/190957 | 12/2016 |
| WO | WO2018/135849 | 7/2018 |

OTHER PUBLICATIONS

Baechtle et al., "Adjustable Audio Indicator," IBM, 2 pages, Jul. 1, 1984.

Blankenbach et al., "Bistable Electrowetting Displays," https://spie.org/x43687.xml, 3 pages, Jan. 3, 2011.

Enns, Neil, "Touchpad-Based Remote Control Devices," University of Toronto, 1998.

Pingali et al., "Audio-Visual Tracking for Natural Interactivity," Bell Laboratories, Lucent Technologies, pp. 373-382, Oct. 1999.

Zhou et al., "Electrostatic Graphene Loudspeaker," Applied Physics Letters, vol. 102, No. 223109, 5 pages, Dec. 6, 2012.

\* cited by examiner

DETECTING THROUGH-BODY INPUTS AT A WEARABLE AUDIO DEVICE

CROSS-REFERENCE TO RELATED APPLICATION

This application is a non-provisional patent application of and claims the benefit of U.S. Provisional Patent Application No. 62/683,571, filed Jun. 11, 2018 and titled "Detecting Through-Body Inputs at a Wearable Audio Device," the disclosure of which is hereby incorporated herein by reference in its entirety.

FIELD

The described embodiments relate generally to wearable audio devices. More particularly, embodiments relate to a wearable audio device capable of detecting touch and force inputs propagated through a body of a user or other structure.

BACKGROUND

An earbud is worn at least partially inside of the ear of a user and typically is configured to produce a range of sounds based on a signal from another device. Many traditional earbuds suffer from significant drawbacks that may limit the ability to control sounds, or other outputs, at the earbud. In many cases, the earbud requires a hardwired connection that physically couples the earbud to another device and the sound is controlled based on input received at the device. Further, earbuds and/or other connected devices may be unresponsive to voice commands, thereby limiting the adaptability of the earbud to control multiple types of functions.

SUMMARY

Certain embodiments described herein relate to, include, or take the form of a wearable audio device. The wearable audio device may include an enclosure. The wearable audio device may further include a sealing component coupled to the enclosure and configured to engage an ear of a user, thereby forming a sealed passage between an ear canal of the ear and the enclosure. The wearable audio device may further include an input device disposed in the enclosure and coupled to the ear canal by the sealed passage, and configured to detect a signal propagating through a body of the user and provide a detection output. The wearable audio device may further include an audio output device acoustically coupled to the ear canal by the sealed passage and configured to provide an audio output. The wearable audio device may further include a processing unit operably coupled to the input device and the audio output device and configured to receive the detection output from the input device and change the audio output from a first mode to a second mode in response to receiving the detection output.

Other embodiments described generally reference a method. The method includes detecting, by an input device of a wearable audio device positioned in an outer ear of a user, an input comprising an audio signal propagating through a body of the user. The method further includes determining, by a processing unit of the wearable audio device, that the input was generated by an input action on the body of the user, and in response to determining that the input is consistent with the input action at the body of the user, adjusting an output of the wearable audio device in accordance with the input.

Still further embodiments described herein generally reference a system that includes a first input device configured to provide a first detection output in response to detecting a signal propagating through a human body and a second input device configured to provide a second detection output in response to detecting the signal propagating through the human body. The system further includes a processing unit operably coupled to the first and second input devices and configured to analyze the first and second detection outputs to determine that the signal was generated by an input action on the human body. The system further includes an audio output device operably coupled to the processing unit and configured to provide an audio output. In response to determining that the signal corresponds to the input action on the human body, the processing unit is further configured to adjust the audio output.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like elements.

Figure 1A:
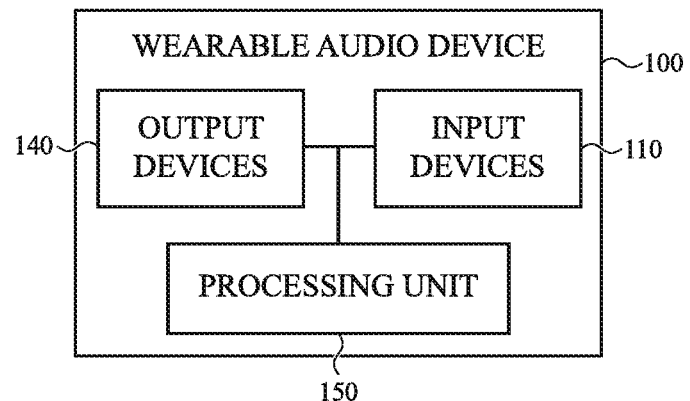
FIG. 1A depicts a functional block diagram of a wearable audio device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes systems, methods, and apparatuses that embody various elements of the present disclosure. However, it should be understood that the described disclosure may be practiced in a variety of forms in addition to those described herein.

The present disclosure describes systems, devices, and techniques related to a wearable audio device, such as an earbud or other device, that is configured to detect inputs and change the operation of the wearable audio device in accordance with the inputs. In some embodiments, the wearable audio device is disposed in a structure and detects signals propagating through or within the structure. Various inputs may cause one or more signals to propagate through or within the structure, outside the structure, or some combination thereof. The wearable audio device may determine whether a detected signal was generated by an input and, if so, change its operation in accordance with the input. Examples of structures include an ear, the walls of an ear canal, a head, a user's body, a body part, and the like.

The wearable audio device may be worn at least partially in an ear of a user. When disposed in an ear, the wearable audio device may be coupled to an ear canal of the user, or another part of the user's body. For example, the wearable audio device may form a sealed passage between an ear canal of the user and one or more components of the wearable audio device. As used herein, an "ear canal" of a human body refers to the open space between the outer ear and the ear drum. Accordingly, the wearable audio device may detect signals propagating through or within the user's body, outside the user's body, or some combination thereof. In various embodiments, the signals detected by the wearable audio device correspond to inputs.

The input devices of the wearable audio device detect signals that correspond to inputs (e.g., detect inputs) from users, other devices, and other sources. In various embodiments, inputs are detected without a user directly interacting with (e.g., physically touching) the wearable audio device. Inputs may not be initiated by any action by a user, but instead by other devices or other sources. In various embodiments described herein, users or devices may perform input actions to provide inputs to the wearable audio device. As used herein, an "input action" refers to any action, condition, or the like that can be detected by a wearable audio device and interpreted by the wearable audio device as an input. In various embodiments, one or more input actions may correspond to inputs at the wearable audio device.

In some embodiments, users perform input actions by interacting with the structure in which the wearable audio device is disposed (e.g., a human body). In some embodiments, a user may contact (e.g., tap, swipe, press, or otherwise contact) the structure. For example, the user may contact an exterior surface of his or her body, such as the skin on his or her face. Further examples of input actions include a user clicking his or her teeth together or clicking his or her tongue. Still further examples include producing vocal sounds, subvocalizations, or other sounds. "Subvocalizations," as used herein, refers to vocal sounds that are below a level at which humans can typically hear, which is typically around 0 decibels. Input actions may further include a user moving a body part, such as moving (e.g., shaking) his or her head, moving his or her hands, arms, legs, and so on. Input actions are not intended to be limited to the user interacting with his or her own body. For example, input actions may include a user contacting or otherwise interacting with another object, such as an inanimate object or another person.

In various embodiments, input actions cause or produce one or more signals to propagate through or within a human body (e.g., through-body signals), outside a human body, or some combination thereof. For example, performing input actions may cause an acoustic, vibration, or other type of signal to propagate through or within the user's body. Similarly, a user performing input actions may cause an optical, image, acoustic, or other type of signal to propagate outside the user's body. The embodiments described herein with respect to a user's body as the structure are applicable to other types of structures as well.

Different input actions may correspond to different inputs at the wearable audio device. For example, a user may swipe on his or her body to provide one type of input and tap on his or her body to provide another type of input. Continuing the example, a user may swipe on his or her body to control a volume of an audio output of the wearable device and/or the user may tap on his or her body to start or pause the audio output.

Some input actions may have a directional component; changing a direction of a gesture, or gesturing in different directions, may be interpreted by embodiments as different inputs. For example, the user may swipe up on his or her body to increase a volume of an audio output of the wearable device, swipe down to decrease the volume, swipe right to advance an audio track, and/or swipe left to repeat or change to a previous audio track.

The input actions may further include a location component, such that the same gesture or action in different locations yields different inputs. For example, a user may tap on a left side of his or her head to pause an audio output and tap on a right side of his or her head to advance an audio track of the audio output.

Wearable audio devices described herein may detect input actions in a variety of ways. One or more input devices of a wearable audio device may detect input actions by detecting the signals produced by input actions. For example, an input device such as a camera or microphone may receive a signal propagating outside of a user's body and generate a corresponding input signal. As another example, an input device such as a microphone or a vibration sensor that is coupled to a user's ear canal, may receive a signal propagating through or within the user's body and generate a corresponding input signal. As used herein, a signal detected "through" or "within" a human body (e.g., a user's body) or other structure refers to a signal that is propagating or has propagated through or within the human body at the time it is detected, and may be referred to as a "through-body signal."

In various embodiments, the input devices may include any suitable components for detecting inputs. Examples of input devices include audio sensors (e.g., microphones), optical or visual sensors (e.g., cameras, visible light sensors, invisible light sensors), proximity sensors, touch sensors, force sensors, mechanical devices (e.g., switches, buttons, keys), vibration sensors, orientation sensors, motion sensors (e.g., accelerometers, velocity sensors), location sensors (e.g., GPS devices), thermal sensors, communication devices (e.g., wired or wireless communication devices), resistive sensors, magnetic sensors, electroactive polymers (EAPs), strain gauges, and so on. or some combination thereof. Each input device may be configured to detect one or more particular types of input and provide an output corresponding to the detected input, for example to a processing unit.

The wearable audio device may include output devices for providing haptic, visual, and/or audio outputs. As described above, the outputs may be generated and/or manipulated based on the inputs detected at the input devices. The outputs provided by the output devices may also be responsive to, or initiated by, a program or application executed by a processing unit of the wearable audio device and/or an associated companion device. The output devices may include any suitable components for providing outputs. Examples of output devices include audio output devices (e.g., speakers), visual output devices (e.g., lights, displays), tactile output devices (e.g., haptic output devices), communication devices (e.g., wired or wireless communication devices), or some combination thereof. Each output device may be configured to receive one or more instructions (e.g., signals), for example from the processing unit, and provide an output corresponding to the instructions.

A speaker or other audio output device of the wearable audio device may provide an audio output through the sealed passage and to the ear canal. The audio output may include music, voice communications, instructions, sounds, alerts and so forth that may be initiated or controlled by a processing unit of the wearable audio device and/or an associated companion device, as described herein. The audio output may be responsive to various types of inputs, including through-body inputs, external inputs, touch and gesture inputs and physical manipulations of controls or other tactile structures. For example, an audio output of the wearable audio device may change from a first mode to a second mode in response to detecting a signal that was generated by an input action.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1A depicts a functional block diagram of a wearable audio device 100, such as the wearable audio device discussed above and described in greater detail below. The wearable audio device 100 includes one or more input devices 110, one or more output devices 140, and a processing unit 150. Broadly, the input devices 110 detect various types of input, and the output devices 140 provide various types of output. The processing unit 150 receives outputs (e.g., detection outputs) from the input devices 110 in response to inputs detected at the input devices. As used herein, a "detection output" is an output generated by an input device in response to detecting a signal. The processing unit 150 may interpret detection outputs received from one or more input devices 110 and send output signals to one or more output devices 140 that instruct the output devices 140 to provide output. Detected input at one or more input devices 110 may be used to control one or more functions of the wearable audio device 100. In this regard, the output devices 140 may be configured to provide outputs that may be manipulated based on the input detected at the input devices 110. The outputs provided by the output devices 140 may also be responsive to, or initiated by, a program or application executed by a processing unit of the wearable audio device 100 and/or an associated companion device.

In various embodiments, the input devices 110 may include any suitable components for detecting inputs. Examples of input devices 110 include audio input devices (e.g., microphones), optical or visual sensors (e.g., cameras, visible light sensors, invisible light sensors), proximity sensors, touch sensors, force sensors, mechanical devices (e.g., switches, buttons, keys), vibration sensors, orientation sensors, motion sensors (e.g., accelerometers, velocity sensors), location sensors (e.g., GPS devices), thermal sensors, communication devices (e.g., wired or wireless communication devices), resistive sensors, magnetic sensors, electroactive polymers (EAPs), strain gauges, and so on. or some combination thereof. Each input device 110 may be configured to detect one or more particular types of input and provide a detection output corresponding to the detected input, for example to the processing unit 150.

The output devices 140 may include any suitable components for providing outputs. Examples of output devices 140 include audio output devices (e.g., speakers), visual output devices (e.g., lights, displays), tactile output devices (e.g., haptic output devices), communication devices (e.g., wired or wireless communication devices), or some combination thereof. Each output device 140 may be configured to receive one or more instructions (e.g., signals), for example from the processing unit 150, and provide an output corresponding to the instructions.

The processing unit 150 is operably coupled to the input devices 110 and the output devices 140. As used herein, "operably coupled" means coupled in any suitable manner for operation, including wiredly, wirelessly, or some combination thereof. The processing unit 150 is adapted to communicate with the input devices 110 and the output devices 140. For example, the processing unit 150 may receive an output from an input device 110 that corresponds to a signal detected by the input device. The processing unit 150 may interpret the output from the input device 110 to determine whether the signal was generated by an input (e.g., an input action) and whether to provide and/or change one or more outputs of the wearable audio device 100 in response the input. The processing unit 150 may then send instructions to one or more output devices 140 to provide and/or change outputs as appropriate. The processing unit 150 may include one or more computer processors or microcontrollers that are configured to perform operations in response to computer-readable instructions. Examples of suitable processing units are discussed in more detail below with respect to FIG. 10.

As discussed herein, it is recognized that a signal detected by an input device 110, the detection output of the input device 110 provided in response to detecting the signal, and further transmissions of the signal contents to additional device components and/or devices may not strictly be the same signal. However, for ease of discussion, the use of the term "signal" herein refers to the original signal as well as the contents of the signal as they are transmitted to various components in various media and take on various forms. Similarly, the use of the term "output" herein refers to an output signal of a device as well as the contents of the output as they are transmitted to various components in various media and take on various forms.

As discussed above, in some embodiments, the input devices 110 include one or more microphones used to detect audio input. The audio input may include voice commands, vibrations, bodily noises, ambient noise, or other acoustic signals. In some cases, the wearable audio device 100 may have one or more dedicated microphones that are configured to detect particular types of audio input. For example, the wearable audio device 100 may include a first microphone, such as a beamforming microphone, that is configured to detect voice commands from a user, a second microphone that is configured to detect ambient noise, and a third microphone that is configured to detect acoustic signals or vibrations from a user's body (such as that produced by a facial tap or other gesture).

The processing unit 150 may receive a detection output from each microphone and distinguish between the various types of inputs. For example, the processing unit 150 may identify a detection output from the microphone(s) associated with an input (e.g., a voice command, a facial tap, and so on) and initiate a signal that is used to control a corresponding function of the wearable audio device 100, such as an output provided by an output device 140. The processing unit 150 may also identify signals from the microphone(s) associated with an ambient condition and ignore the signal and/or use the signal to control an audio output of the wearable audio device 100 (e.g., a speaker), such as acoustically cancelling or mitigating the effects of ambient noise.

One or more input devices 110 may operate to detect a location of an object or body part of a user relative to the wearable audio device 100. This may also include detecting gestures, patterns of motion, signs, finger or hand positions, or the like. To facilitate the foregoing, the wearable audio device 100 may include a capacitive sensor that is configured to detect a change in capacitance between an electrode of the sensor and a user. As the user approaches the sensor, the capacitance changes, and thus may be used to determine a distance of the user relative to the electrode. In this manner, multiple capacitive sensors may be used to track a location or position of a body part of the user along an exterior surface of the wearable audio device 100.

In some cases, the capacitive sensor may also be used to measure or detect a force input on an exterior surface of the wearable audio device 100. For example, the user may press the exterior surface and deform the surface toward the electrode of the sensor. The surface may deform by a known amount for a given force, and thus a force applied by the user to the surface may be determined based on the positioned of the user derived from the change in capacitance.

As discussed above, the wearable audio device 100 may also include one or more visual or optical sensors. The optical sensors may, in certain embodiments, measure an intensity of light at one or more locations on the exterior surface of the wearable audio device 100. A decrease in the intensity of light at a particular location may be associated with a user input or gestures, such as a cupping gesture over the wearable audio device 100. A lens or protective window of the optical sensor may be camouflaged from a surrounding surface of the wearable audio device 100, for example, using an optical coating, which may match the surrounding surface but be translucent to certain wavelengths of light. In other embodiments, the optical sensor may be, or form a component of, a camera or camera system. This may allow the wearable audio device 100 to detect and recognize specific types of gestures using pattern recognition.

Optical sensors, in certain embodiments, may also be used to detect a location of the wearable audio device 100. For example, an optical sensor may be positioned relative to a portion of the wearable audio device 100 configured to be worn in a user's ear. This may allow the optical sensor to detect a receipt of the wearable audio device 100 within a person ear (e.g., in response to a decrease in light intensity measured at the sensor).

The input devices 110 may also include one or more mechanical devices or tactile structures that are configured to receive physical input or manipulations. Physical manipulations may include a squeeze, a collapse, a roll or rotation, a jog, a press, a pull, and so on. In some cases, the physical input may manipulate the mechanical device or tactile structure and cause the mechanical device or tactile structure to physically complete a switch or circuit that triggers a switch event. In other cases, the physical manipulation of the tactile structure is detected or recognized by substantially non-contact types of sensors or switches of the wearable audio device 100, such as an optical reader detecting the rotation of a wheel, and so on. The mechanical device or tactile structure may therefore take various forms, including a textured exterior surface, a multi-input button or dome, a wheel, a crown, and so on.

The wearable audio device 100 may include various other components and sensors that are configured to detect input. In one embodiment, the wearable audio device 100 may include an antenna that is configured to communicatively or wirelessly couple the wearable audio device 100 to another device, such as the companion device 170 described below with respect to FIG. 1B. Accordingly, the wearable audio device 100 may be configured to receive input signals from other devices such as the companion device 170. As described above, the inputs may be used to control one or more outputs of the wearable audio device 100, such as an audio output.

As a further example, the input devices 110 may include a thermal sensor to detect the placement of the wearable audio device 100 within a user's ear. Accelerometers and speed sensors may be used to detect changing conditions, for example, when the wearable audio device 100 is used or otherwise worn by a user driving an automobile. In other cases, other combinations of sensors and associated functionalities are possible and contemplated herein.

As described above, an input device 110 may initiate or provide a signal corresponding to an input detected at the input device. The signal may be provided to the processing unit 150 and used to control one or more outputs of the wearable audio device 100. In this regard, the wearable audio device 100 may include various output devices 140 in order to provide outputs and alter or manipulate the outputs based on detected inputs.

The output devices 140 may include one or more audio output devices, such as speakers, configured to produce an audio output, such as various types of music, voice communications, instructions, sounds, alerts, other acoustic signals, or some combination thereof. In some embodiments, the speakers have a relatively small form factor corresponding to that of the wearable audio device 100 so that the speakers may be disposed within an enclosure of the wearable audio device 100. For example, the speaker may generally have a maximum dimension within a range of several millimeters, however other dimensions are possible. Notwithstanding, the speaker may be configured to provide substantially high-resolution audio output to a user. This may be facilitated by the various components (e.g., sealing component 322 of FIG. 3A) described herein that are used define a sealed passage between an interior volume of the wearable audio device 100 (which houses the speaker) and the user's ear canal. The speaker may also be tuned to operate in one or more modes that facilitate canceling or mitigating ambient noise detected by, for example, one or more of the microphones of the wearable audio device 100. For example, various characteristics of the audio output may be altered, for example by the processing unit 150, in order to compensate for the interference of the ambient noise.

Audio outputs may be configured to change in response to inputs received at the wearable audio device 100. For example, the processing unit 150 may be configured to change the audio output provided by a speaker in response to an input corresponding to a gesture input, physical manipulation, voice command, and so on. The speaker may thus receive multiple distinct signals from the processing unit 150 corresponding to different types of input or otherwise corresponding to distinct functions. To illustrate, a first signal corresponding to a first gesture input may cause the processing unit 150 to alter the audio output in a first manner (e.g., such as increasing playback volume in response to an up swipe), and a second signal corresponding to a second gesture input may cause the processing unit 150 to alter the audio output in a second manner (e.g., such as decreasing playback volume in response to a down swipe), among other possibilities.

The output devices 140 may include one or more tactile output devices configured to produce a tactile or haptic output. Haptic outputs may be facilitated by a haptic feedback structure, such as a dome, electromechanical actuator, and so forth. The output devices 140 may include one or more tactile structures to provide a tactile indication of, for example, the receipt of input by the wearable audio device 100. This may include a buckling of a collapsible dome, or other deformation of a structure that registers input in response to a physical manipulation. Additionally or alternatively, a tactile structure may visually and/or tactilely indicate a region of the wearable audio device 100 operable to receive input. For example, a textured surface may provide a tactile output to a user as the user feels the changing contours of the surface.

The output devices 140 may include one or more visual output devices configured to illuminate or otherwise visually alter a portion of the wearable audio device 100, such as an exterior surface. Various lights or visual indicators may be used to produce a visual output of the wearable audio device 100. The visual output may be indicative of an operational status of the wearable audio device 100. For example, the visual output may include certain colors that represent a power-on mode, a standby mode, a companion-device pairing mode, a maintenance mode, and so on.

Visual output may also be used to indicate a receipt of input by the wearable audio device 100. As one possibility, visual indicators along a surface of the wearable audio device 100 may produce a momentary flash, change colors, and so on, in response to received inputs. In this regard, the visual output may be responsive or adaptable to the various different types of input detected or that otherwise correspond to distinct functions of the wearable audio device 100. This may include producing a first visual output (e.g., a first color, animation, or sequence) in response to a first input (audio, gesture, mechanical, and so forth) and producing a second visual output (e.g., second color, animation, or sequence) in response to a second input (audio, gesture, mechanical, and so forth).

Additional or alternative output devices 140 may generally be configured to produce other types of output, including but not limited to, thermal outputs, pressure outputs, outputs for communication to external or companion devices, and so on. In one embodiment, the wearable audio device 100 may include an antenna that is configured to communicatively or wirelessly couple the wearable audio device 100 to another device, such as the companion device 170 described below with respect to FIG. 1B. The wearable audio device 100 may thus transmit an output signal from the to the companion device 170 that may be used to control one or more outputs of the companion device 170, such as an audio output.

The input devices 110 and the output devices 140 described with respect to FIG. 1A may include a collection of mechanical components, sensors, instruments, processing unit(s), computer-readable instructions, and so forth that collectively operate to perform the functions described herein. Rather than define discrete or isolated systems, it will be appreciated that the devices may use common or overlapping components to perform the described functions. Further, in addition to those described with respect to FIG. 1A, the wearable audio device 100 may include any other appropriate hardware (e.g., sensors, switches, antennas, processing units, memories), software (e.g., applications, system programs, engines), network components (e.g., communication paths, interfaces, routers), and so forth for use in facilitating any operations disclosed herein, for example, such as those described below with respect to FIG. 10.

Figure 1B:
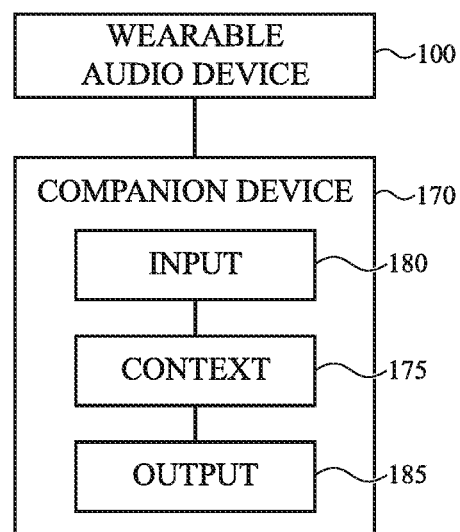
FIG. 1B depicts a functional block diagram of a wearable audio device and a companion device.

FIG. 1B depicts a functional block diagram of a wearable audio device and a companion device 170. In particular, the wearable audio device 100, described above with respect to FIG. 1A, is shown communicatively coupled to a companion device 170. The companion device 170 may be substantially any computing device that is configured to receive input and initiate a signal that is used to control the wearable audio device 100. In some embodiments, the functionality of the companion device 170 is provided by the wearable audio device 100. Companion devices include, but are not limited to, a personal computer, a notebook computer, a tablet, a smart phone, a watch, a case for the wearable audio device 100, a home automation device, and so on.

The wearable audio device 100 and the companion device 170 may be communicatively coupled via a wireless connection. For example, the wearable audio device 100 may be paired with the companion device 170 using a short range wireless interconnection; however, other wireless connection techniques and protocols may be used. In other embodiments, the wearable audio device 100 and the companion device 170 may be connected via a wired connection.

FIG. 1B depicts various functional modules of the companion device 170. Each functional module or submodule described with respect to FIG. 1B may include a collection of mechanical components, sensors, instruments, processing unit(s), computer-readable instructions, and so forth that collectively operate to perform the functions described herein. It will be appreciated that the companion device 170 also may include any appropriate hardware, software, network components, and so forth for use in facilitating any operations disclosed herein, for example, such as those described below with respect to FIG. 10.

For purposes of illustration, the companion device 170 includes at least a context module 175, an input module 180, and an output module 185. Broadly, the context module 175 may be configured to provide an operational context to the wearable audio device 100. An operational context may be, or include, information associated with an application or program executed on the companion device 170 (e.g., such as an application executed by the processing unit 150). The operational context may therefore be used by the wearable audio device 100 to provide an output, such as a music output (where the executed program is an audio file), a voice communication output (where the executed program is a telephone call), an audio notification output (where the executed program is a navigation application), among various other possibilities.

The operational context may also be used by the wearable audio device 100 to determine or activate a particular type of input or sensor. For example, different types of gestures, audio input, physical manipulations and so forth may be registered as input (or ignored) based on the operational context. To illustrate, where the operational context causes the wearable audio device 100 to output music, the processing unit 150 may be configured to control the music based on a direction of motion of different types of input. In another mode, where the operational context causes the wearable audio device 100 to output voice communications, the processing unit 150 may be configured to control the music based on a physical manipulation of a tactile structure (and ignore gesture inputs), among various other possibilities.

With reference to the input module 180, the companion device 170 may be configured to receive input using various different sensors and structures. For example, the companion device 170 may include mechanical buttons, keyboards, touch-sensitive surfaces, trackpads, microphones, and other sensors. The input detected by the input module 180 may be used to control an output of the wearable audio device 100. As one example, an audio playback volume may be increased or decreased in response to a manipulation of one or more mechanical keys or buttons of the companion device 170. The input detected by the input module 180 may also be used to control a mode of the wearable audio device 100, such as a mode for detecting certain audio inputs. For example, the wearable audio device 100 may be configured to enter a mode in which audio input is used to control a function of the wearable audio device 100 and/or the companion device 170.

With reference to the output module 185, the companion device 170 may be configured to provide output using various different components and structures. For example, the companion device 170 may include speakers, a display, tactile structures, and other components. The output provided by the output module 185 may be responsive to input detected by the wearable audio device 100. As one example, in response to a detection of input at the wearable audio device 100, a graphic may be depicted at a display of the companion device 170, or, likewise, a sound may be produced at a speaker of the companion device 170. The output module 185, more generally, may also be used to indicate a status of the wearable audio device 100 to a user. For example, the output module 185 may produce an output, visual or otherwise, corresponding to different modes of the wearable audio device 100, including a power-on mode, a standby mode, a battery status level, among various other indications.

Figure 2:
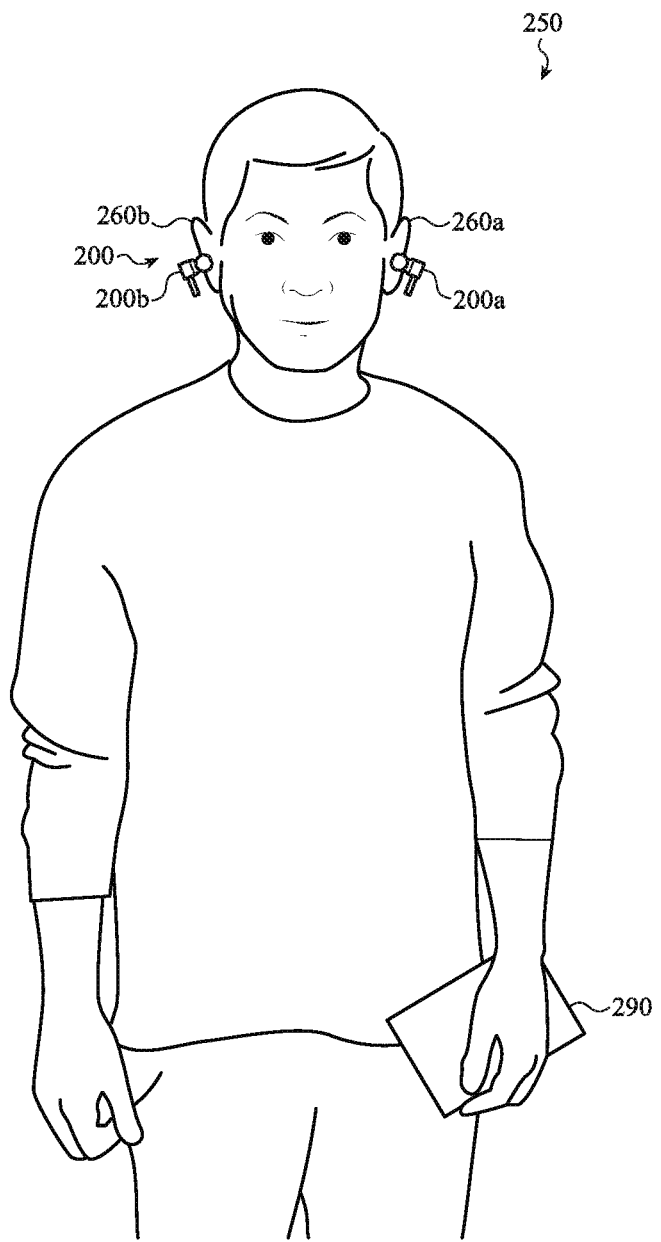
FIG. 2 depicts wearable audio devices worn by a user.

FIG. 2 depicts wearable audio devices 200 worn by a user 250. The wearable audio devices 200 may be a pair of devices, such as a first wearable audio device 200a and a second wearable audio device 200b, shown in FIG. 2. Each of the first wearable audio device 200a and the second wearable audio device 200b may be substantially analogous to the wearable audio device 100 described above with respect to FIGS. 1A and 1B. For example, the wearable audio devices 200 may each be configured to detect inputs (e.g., audio, gesture, physical manipulation, and so on) and provide and/or change one or more outputs based on the detected inputs. In this regard, it will be appreciated that the wearable audio device 200 may include similar components and/or be configured to perform similar functions as the wearable audio device 100 described above. Redundant explanation of these components is omitted here for clarity.

The wearable audio devices 200 may be worn by the user 250, as shown in FIG. 2. In particular, the wearable audio devices 200 may be configured to be received and temporarily secured at an outer ear of the user 205. In some cases, at least a portion of each of the wearable audio devices 200 may engage or seal a portion of a user's ear (such as forming a seal around a wall of the user's ear canal). This may support the device within the ear, and optionally form a sealed passage between components of the device and an ear canal of the user 250. In the embodiment of FIG. 2, the first wearable audio device 200a may be positioned at least partially within a first ear 260a of the user 250, and the second wearable audio device 200b may be positioned within a second ear 260b of the user 250. While FIG. 2 shows the user 250 wearing both the first wearable audio device 200a and the second wearable audio device 200b, it will be appreciated that in some cases a user 250 may optionally wear a single one of the first wearable audio device 200a or the second wearable audio device 200b. Further, notwithstanding the wearable audio devices 200 being configured to form a sealed passage with an ear canal of the user 250, each of the wearable audio devices 200 may be selectively removable by the user 250, and therefore allow the user 250 to wear and remove the wearable audio devices 200 as needed or desired.

In various embodiments, the wearable audio devices 200a and 200b may be communicably coupled. For example, the input devices and output devices of the wearable audio devices 200a and 200b may include communication devices configured to communicably couple the wearable audio devices 200a and 200b.

FIG. 2 also shows the user 250 holding a companion device 290. The companion device 290 may be substantially analogous to the companion device 170 described above with respect to FIG. 1B. The companion device 290 may be wirelessly coupled to the wearable audio devices 200. In some cases, the companion device 290 may be configured to transmit information or commands associated with an operational context to one or both of the wearable audio devices 200. This may include information corresponding to an application or program executed on the companion device 290. For example, the companion device 290 may execute a music playback program, and thus the companion device 290 may provide information to the wearable audio devices 200 corresponding to the playback. The wearable audio device 200 may receive the information associated with the operational context and provide an output to the user 250 based on the received information. For example, upon receipt of the music playback information, the wearable audio devices 200 may be configured to provide an audio output to the user 250 that is, or includes, the music playback executed by the companion device 290.

The wearable audio device 200 may also detect input as described above with respect to FIGS. 1A and 1B. This may be used to control, for example, a function of the wearable audio device 200 (e.g., as indicated by a manipulation of an output of the device) or a function of the companion device 290. In some cases, each of the wearable audio devices 200 may detect the same type of input and/or otherwise be used to redundantly control the same function. This may be the case, for example, where each of the wearable audio devices 200 is used to control playback volume of an audio output in response to a swipe along an exterior surface of either device. Additionally or alternatively, each of the wearable audio devices 200 may detect different types of input and/or be used to control different functions. This may be the case where, for example, the first wearable audio device 200a is used to control a first function (e.g., play track) in response to an input, and the second audio device 200b is used to control a second function (e.g., stop track) in response to another input. Such controls may be interchangeable, programmable, or otherwise based at least partially on the operational context provided by the companion device 290. Further, while FIG. 2 shows the wearable audio device 200 and the companion device 290, it will be appreciated that the wearable audio device 200 may operate independently from any companion device. For example, and as described herein with respect to FIG. 10, applications, programs, or the like may be executed exclusively on one or both of the first wearable audio device 200a or the second wearable audio device 200b, without necessarily pairing the devices to another external device. FIG. 2 illustrates the wearable audio devices 200 worn by the user 250, but in various embodiments, the wearable audio devices 200 may be disposed in any suitable structure. The wearable audio device 200 are shown as earbuds in FIG. 2 as one example. In various embodiments, the wearable audio device 200 may take different forms, including as all or part of a headband, lanyard, or other object. In some embodiments, the wearable audio device 200 may be a part of a headset, such as a virtual reality headset.

Figure 3A:
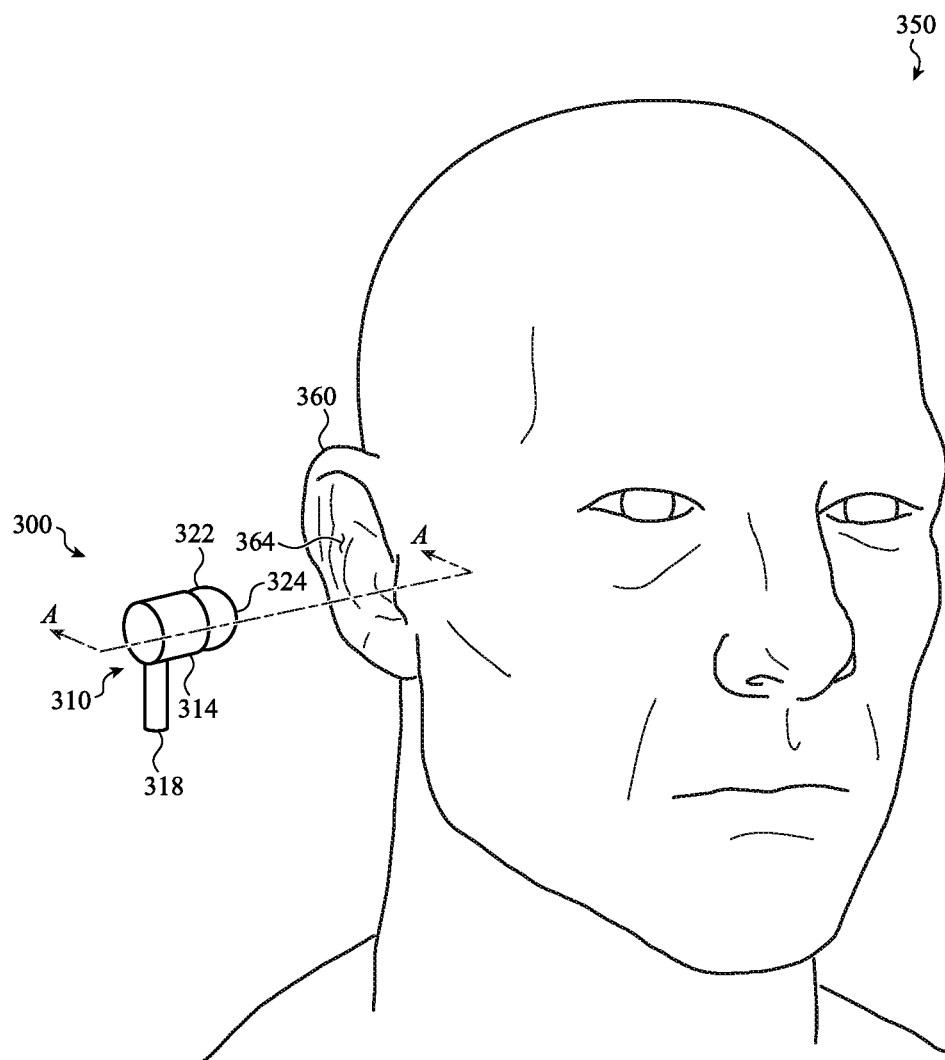
FIG. 3A depicts a wearable audio device.

FIG. 3A depicts a wearable audio device 300 and a user 350. The wearable audio device 300 is shown in FIG. 3A separated from the user 350. In this regard, rather than being worn, the wearable audio device 300 is shown in FIG. 3A as occupying a position that allows the user 350 to readily advance the wearable audio device 300 toward an ear 360 of the user 350. The ear 360 may generally include an ear surface 364. The wearable audio device 300 may be configured to engage and/or form a seal with the ear surface 364. This may allow the wearable audio device 300 to provide an audio output directly to the user 350, such as through a sealed passage defined between the audio component of the wearable audio device 300 and the user 350.

To facilitate the foregoing, FIG. 3A shows an example construction of the wearable audio device 300. In particular, FIG. 3A shows the wearable audio device 300 including at least an enclosure 310 and a sealing component 322. The enclosure 310 may define an interior volume containing various sensors, output devices, and other components of the wearable audio device 300. The enclosure 310 may have a form factor that allows the wearable audio device 300 to fit at least partially in the ear 360 of the user 350. While the enclosure 310 may take many forms, in certain embodiments, such as that shown in FIG. 3A, the enclosure 310 may include a main unit 314 and a stem 318. Each of the main unit 314 and the stem 318 may house the input and/or output devices of the wearable audio device 300, as appropriate for a given application. In one embodiment, the main unit 314 may house relatively larger components of the wearable audio device 300, such as a speaker and/or processing unit, and the stem 318 may house components of the wearable audio device 300 that may benefit from the elongated shape of the stem 318, such as various microphones, antennas, and so on.

The enclosure 310 may be coupled to the sealing component 322. The sealing component 322 may be fitted or positioned around a side of the enclosure 310. For example, the enclosure 310 may define a speaker opening, and the sealing component 322 may be positioned around this opening. The sealing component 322 may be configured to engage a structure, such as the ear 360 of the user 350. For example, the sealing component 322 may be positioned in an opening of a structure, such as the ear canal of the ear 360. The sealing component 322 may include a conformable surface 324 that may be pressed into the opening of the structure and engage with the structure at the opening, such as the ear surface 364. In some cases, the sealing component 322 being positioned in the opening may form or define a substantially sealed interior volume within the structure. The sealed interior volume may be substantially vacant. In one embodiment, the substantially sealed interior volume is formed by the sealing component 322 and the ear canal of the user.

In some embodiments, the sealing component couples one or more components of the wearable audio device with the interior volume and/or the structure. For example, the ear canal of the user 350 or another portion of the user's body may be coupled to input devices and/or output devices of the wearable audio device 300, as shown and described below with respect to FIGS. 4B and 6A-6C. In some embodiments, the sealing component 322 forms or defines a passage between components of the wearable audio device and the interior volume and/or the structure. In some embodiments, the sealing component 322 facilitates a direct coupling between components of the wearable audio device and the interior volume and/or the structure.

The sealing component 322 may be formed from a variety of materials, including elastically deformable materials, such as silicon, rubber, nylon, and various other synthetic or composite materials. The sealing component 322 may, in some embodiments, be removable from the enclosure 310 by the user 350, therefore allowing the user 350 to interchange various different sealing components with the enclosure 310 of the wearable audio device 300 based on user customizable preferences. In some embodiments, the sealing component 322 is integrated with the enclosure 310, meaning that the sealing component 322 is a part of the enclosure 310 and/or the sealing component 322 and the enclosure 310 form a common structure.

Figure 3B:
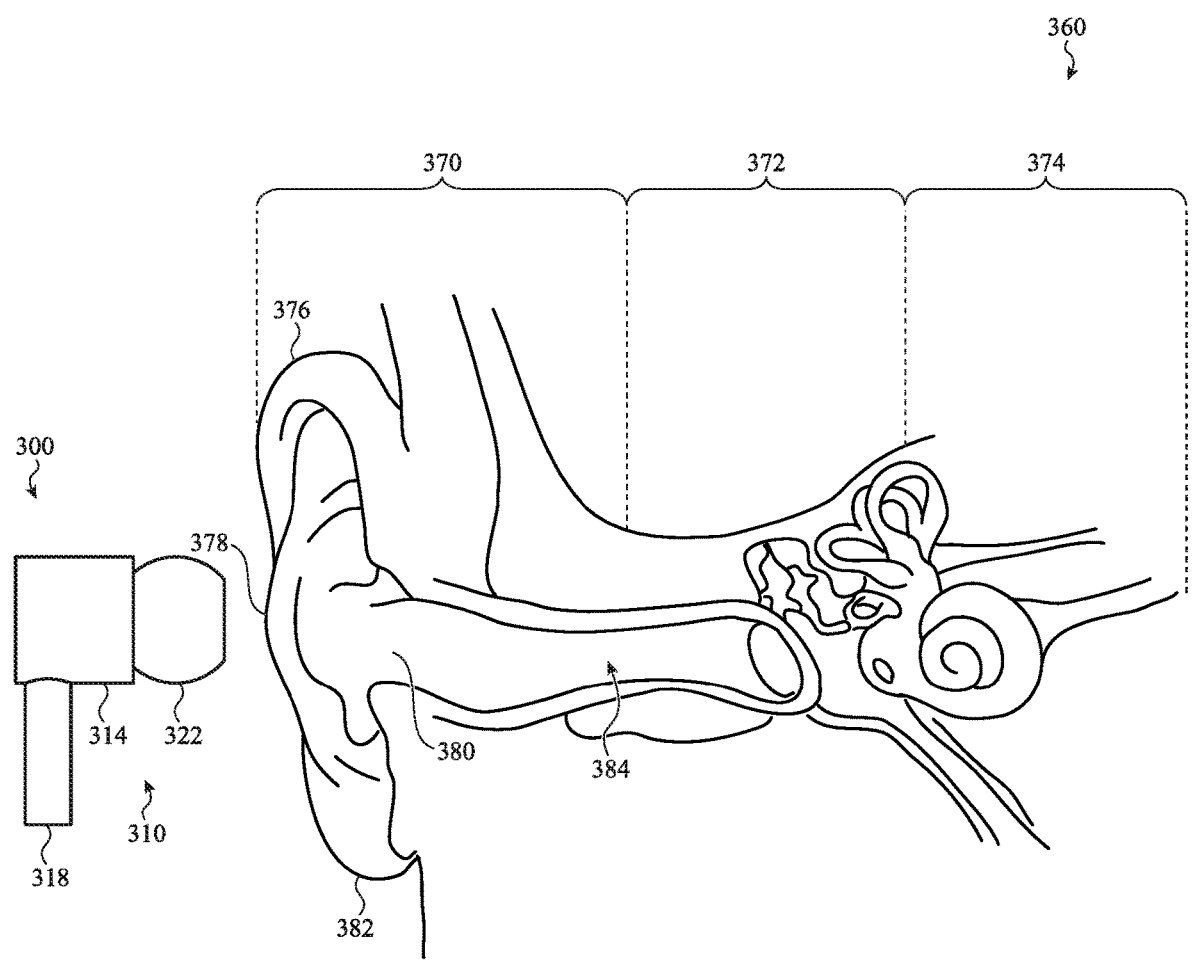
FIG. 3B depicts a cross-sectional view of the wearable audio device and the user of FIG. 3A, taken along line A-A of FIG. 3A.

FIG. 3B depicts a cross-sectional view of the ear 360 of the user 350, taken along line A-A of FIG. 3A. The wearable audio device 300 is also shown separated from the ear 360. Broadly, the ear 360 may include an outer ear region 370, a middle ear region 372, and an inner ear region 374. FIG. 3B shows various features of the ear 360 that may be coupled to the wearable audio device 300 when the wearable audio device 300 is worn by the user 350. For example, features of the outer ear region 370 may include a helix 376, an antihelix 378, a concha 380, an auricular lobule 382, and an ear canal 384, among other features. The ear canal 384 may extend from an external opening of the outer ear region 370, through the middle ear region 372, and towards the inner ear region 374 where acoustic signals from the wearable audio device 300 may be processed by the user 350.

Figure 4A:
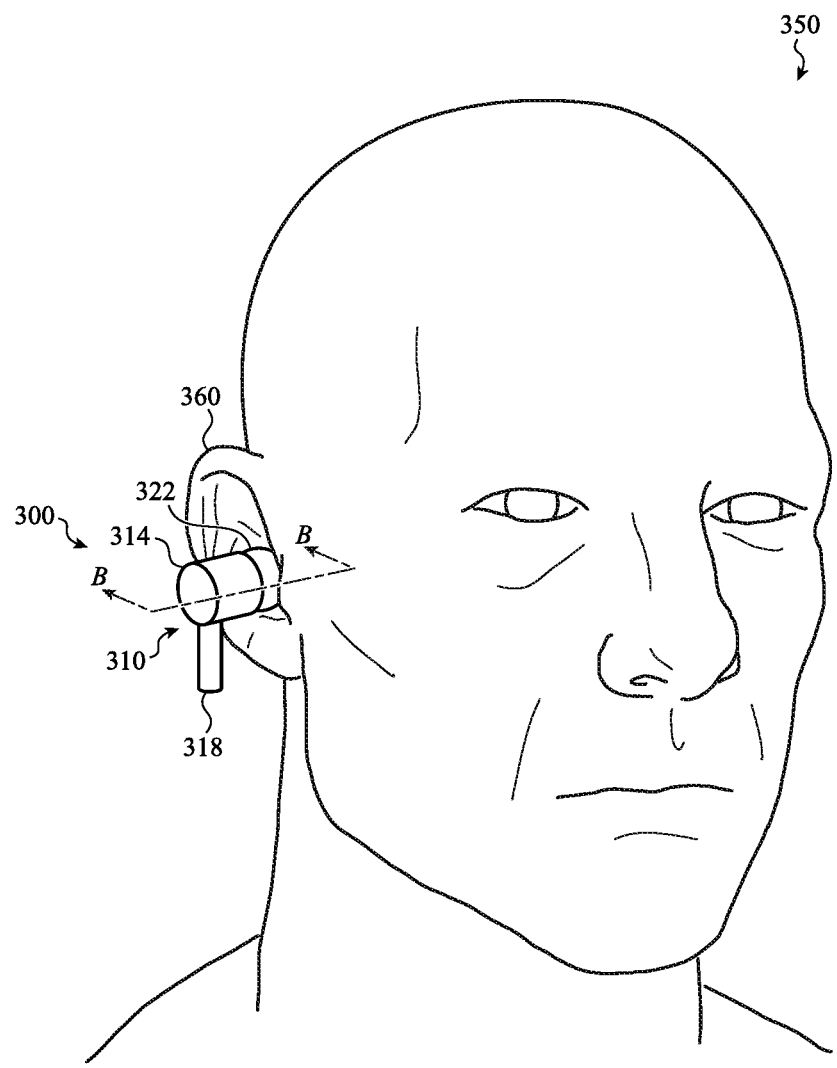
FIG. 4A depicts a wearable audio device positioned in the ear of a user.

FIG. 4A depicts the wearable audio device 300 and the user 350. In particular, FIG. 4A depicts a configuration in which the wearable audio device 300 is worn by the user 350. For example, the wearable audio device 300 may be received at least partially within the ear 360 of the user 350. When the wearable audio device 300 is worn by the user 350, the sealing component 322 may be pressed into the ear 360, thereby causing the conformable surface 324 of the sealing component 322 to contact and conform or partially conform to the ear surface 364. The sealing component 322 may engage the ear surface 364 to form a seal with the ear 360. This may allow the sealing component 322 to form a sealed passage between components of the wearable audio device 300 and, for example, an ear canal of the user.

Figure 4B:
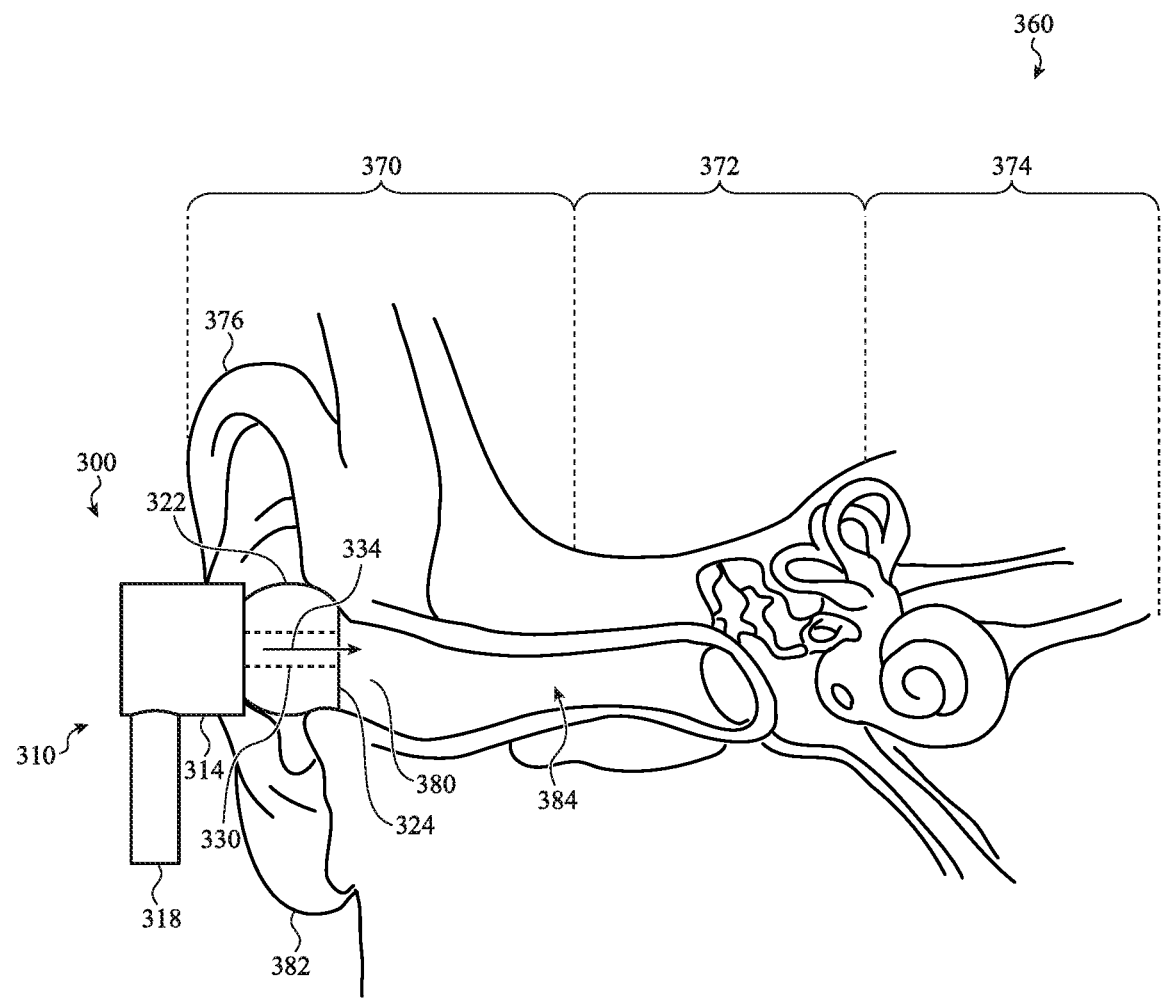
FIG. 4B depicts a cross-sectional view of the wearable audio device and the user of FIG. 4A, taken along line B-B of FIG. 4A.

FIG. 4B depicts a cross-sectional view of the ear 360 of the user 350, taken along line B-B of FIG. 4A, and the wearable audio device 300. As shown in FIG. 4B, the wearable audio device 300 may be at least partially received with the ear 360. For example, the sealing component 322 may be received within a portion of the outer ear region 370. The sealing component 322 may contact various features of the outer ear region 370 and form a seal about the ear canal 384. For example, the sealing component 322 may contact one or more of the helix 376, the antihelix 378, the concha 380, and/or various other features of the outer ear region 370 that may be positioned about the ear canal 384.

As described herein, the sealing component 322 may be used to form a sealed passage between various internal components of the wearable audio device 300 and the ear canal 384 of the user 350. FIG. 4B shows a sealed passage 330. The sealed passage 330 may extend between an interior volume of the enclosure 310 and the ear canal 384. The sealed passage 330 may allow the wearable audio device 300 to propagate audio outputs into the ear canal 384, while mitigating or preventing the audio output from being released into a surrounding environment. For example, FIG. 4B shows an example path 334 of an acoustic signal generated by the wearable audio device 300 traveling through the sealed passage 330 and into the ear canal 384. This configuration may improve sound quality and also allow the sealing component 322 to block ambient noises or other environmental containments from entering the ear canal 384.

As described above, the input devices of the wearable audio device detect inputs from users, other devices, and other sources. In various embodiments, inputs are detected without a user directly interacting with (e.g., physically touching) the wearable audio device. Inputs may not require any action by a user, but instead be initiated by other devices or other sources. In various embodiments described herein, users may perform input actions to provide inputs to the wearable audio device. As used herein, an "input action" refers to any action, condition, or the like that can be detected by a wearable audio device and interpreted by the wearable audio device as an input. In various embodiments, one or more input actions may correspond to inputs at the wearable audio device.

In some embodiments, users perform input actions by interacting with the structure in which the wearable audio device is disposed. In some embodiments, a user may contact (e.g., tap, swipe, press, or otherwise contact) the structure. For example, the user may contact an exterior surface of his or her body, such as the skin on his or her face. Further examples of input actions include a user clicking his or her teeth together or clicking his or her tongue. Still further examples include producing vocal sounds, subvocalizations, or other sounds. "Subvocalizations," as used herein, refers to vocal sounds that are below a level at which humans can typically hear, which is typically around 0 decibels. Input actions may further include a user moving a body part, such as moving (e.g., shaking) his or her head, moving his or her hands, arms, legs, and so on. Input actions are not intended to be limited to the user interacting with his or her own body. For example, input actions may include a user contacting or otherwise interacting with another object, such as an inanimate object or another person.

In some embodiments, different input actions correspond to different inputs at the wearable audio device 300. An input action may be a force exerted on a particular part or location of a structure (such as a human body), for a particular time, and/or in a particular direction. Put another way, the input may be a gesture performed on a body part, such as the head, cheek, chin, forehead, and so on; this gesture may be detected by the wearable audio device 300 and used to adjust an output, operating condition, or the like of the device.

For example, a user may swipe on his or her body to provide one type of input and tap on his or her body to provide another type of input. For example, a user may swipe on his or her body to control a volume of an audio output of the wearable device and/or the user may tap on his or her body to start or pause the audio output. The input actions may have a directional component that corresponds to different inputs. For example, the user may swipe up on his or her body to increase a volume of an audio output of the wearable device, swipe down to decrease the volume, swipe right to advance an audio track, and/or swipe left to repeat or change to a previous audio track. The input actions may further include a location component that corresponds to different inputs. For example, a user may tap on a left side of his or her head to pause an audio output and tap on a right side of his or her head to advance an audio track of the audio output.

In various embodiments, input actions cause or produce one or more signals to propagate through or within a human body (e.g., the user's body), outside the human body, or some combination thereof. For example, performing input actions may cause an acoustic, vibration, or other type of signal to propagate through or within the user's body. Similarly, a user performing input actions may cause an optical, image, acoustic, or other type of signal to propagate outside the user's body. As described above, the wearable audio devices described herein may be positioned in a structure besides a human ear or human body. For example, the wearable audio device may be positioned in an opening in a structure and may form a substantially sealed volume within the structure. Input actions may cause or produce one or more signals to propagate through or within the structure, outside the structure, or some combination thereof. The embodiments described herein with respect to a user's body as the structure are applicable to other types of structures as well.

The wearable audio devices described herein may detect input actions in a variety of ways. One or more input devices of a wearable audio device may detect input actions by detecting the signals produced by input actions. For example, an input device such as a camera or microphone may receive a signal outside of a user's body that was generated by an input action. As another example, an input device such as a microphone or a vibration sensor coupled to a user's ear canal, may receive a signal through or within the user's body that was generated by an input action. As used herein, a signal detected through or within a user's body refers to a signal that is propagating or has propagated through or within the user's body at the time it is detected. Detecting input actions is discussed in more detail below with respect to FIGS. 5-9.

As described above, an output or function of the wearable audio device may be changed in response to detecting signals that correspond to input actions. For example, an audio output of the wearable audio device may change from a first mode to a second mode in response to detecting a signal that was generated by an input action.

Figure 5:
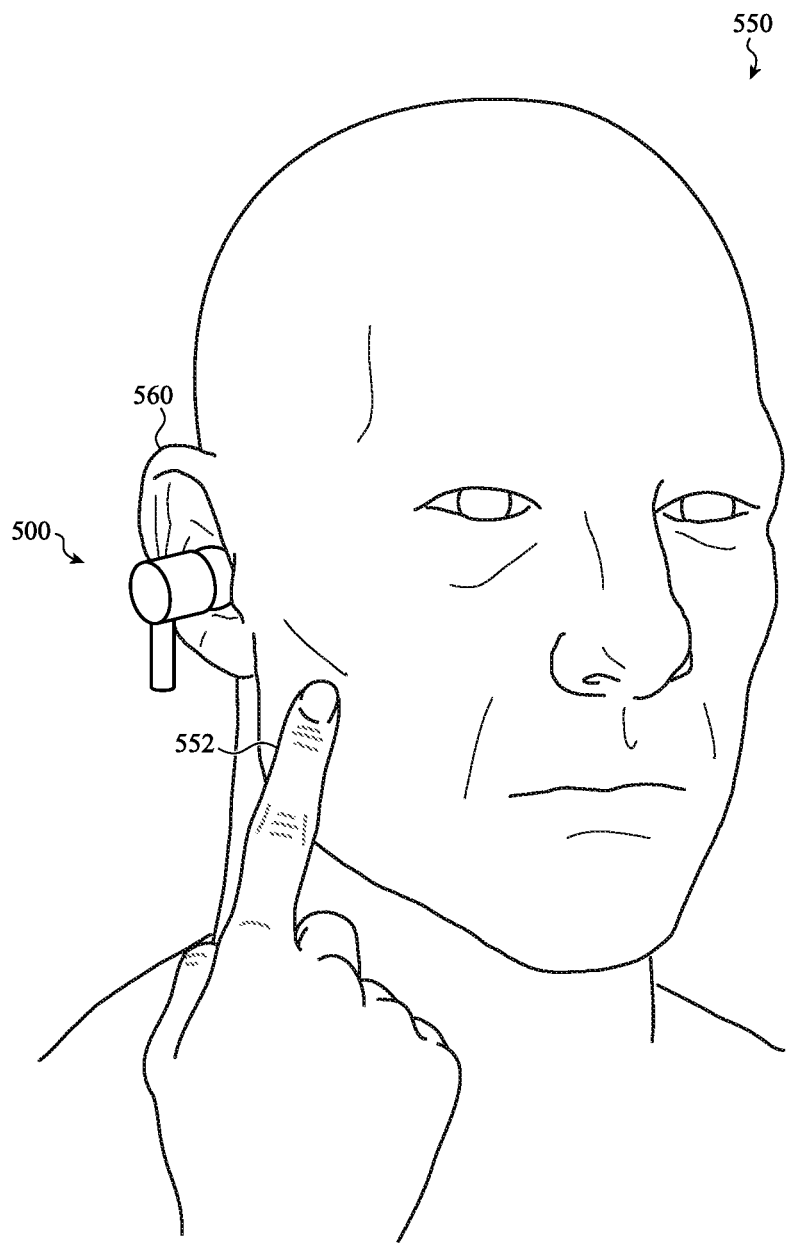
FIG. 5 depicts a wearable audio device positioned in the ear of a user.

FIG. 5 depicts a wearable audio device 500 positioned in the ear 560 of a user 550. The wearable audio device 500 is similar to the wearable audio devices described herein (e.g., wearable audio devices 100, 200, and 300), and the features, components, and functionality discussed with respect to the wearable audio devices described herein are applicable to the wearable audio device 500. The placement of the wearable audio device 500 in the ear of the user 550 is similar to the placement described above with respect to FIGS. 2-4B.

The wearable audio device 500 includes functionality for detecting input actions. The wearable audio device 500 includes one or more input devices as discussed above with respect to FIGS. 1-4B for detecting signals that correspond to input actions. In some embodiments, the user 550 may perform an input action by contacting a body part of the user. For example, as shown in FIG. 5, the user may contact the user's head using the user's finger 552. The input devices of the wearable audio device 500 may detect signals that correspond to the input action. A processing unit of the wearable audio device 500 or another device may determine that the signal corresponds to the input action and perform one or more actions, such as initiating and/or changing outputs of the wearable audio device.

Figure 6A:
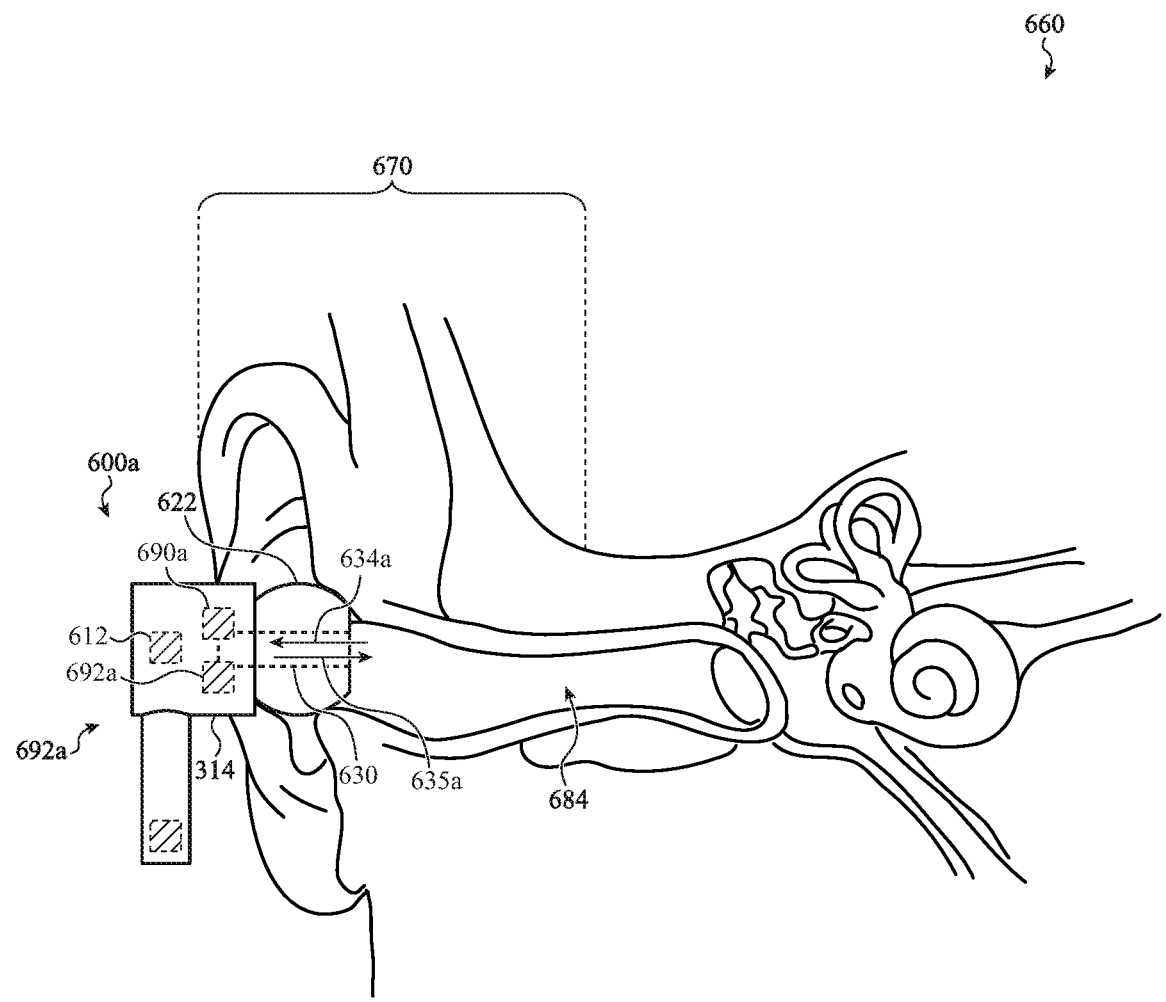
FIGS. 6A-6C depict cross-sectional views of an ear of a user and embodiments of a wearable audio device.
Figure 6B:
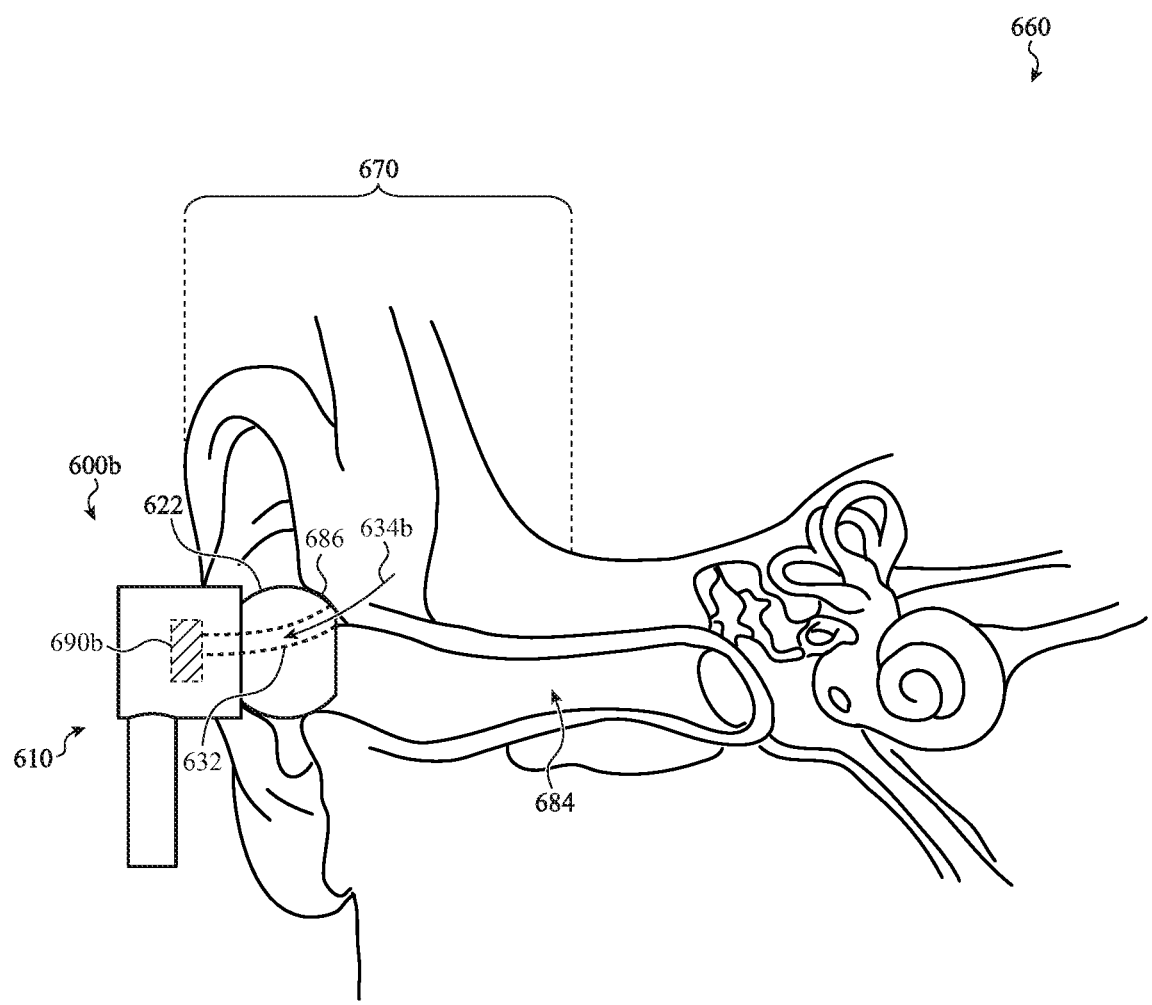
Figure 6C:
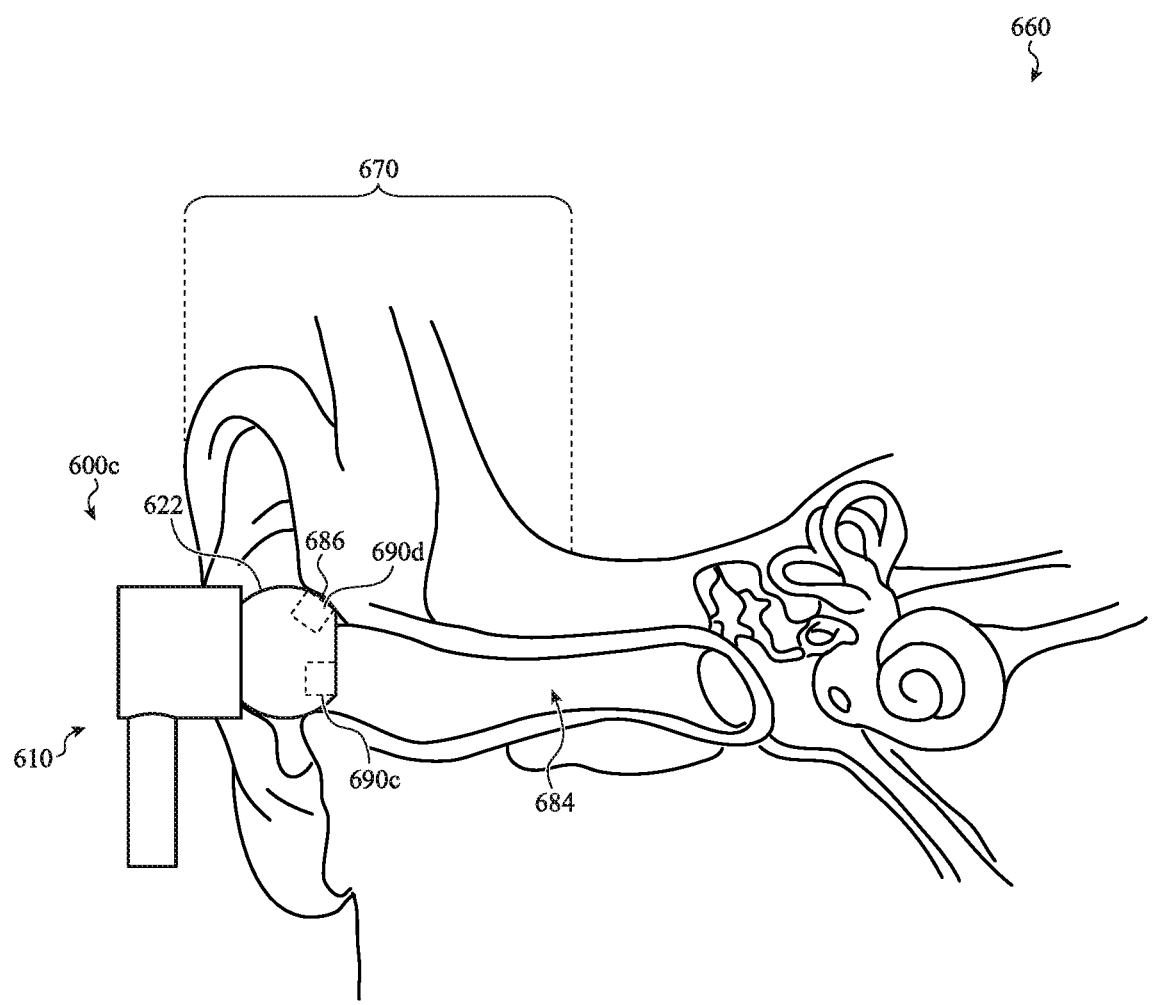

FIGS. 6A-6C depict cross-sectional views of an ear 660 of a user and embodiments 600A-C of a wearable audio device. The cross-sectional views of FIGS. 6A-6C are similar to the cross-sectional view of FIG. 4B, and the features and functionality discussed with respect to the components shown and described with respect to FIG. 4B are applicable to the components shown and described with respect to FIGS. 6A-6C. Furthermore, the embodiments discussed with respect to FIGS. 6A-6C may include similar components and functionality as any other embodiments discussed herein, including other embodiments discussed with respect to FIGS. 6A-6C. As shown in FIGS. 6A-6C, the wearable audio device 600 may be at least partially received with the ear 660. For example, a sealing component 622 may be received within a portion of the outer ear region 670 and form a seal about the ear canal 684 as described above with respect to FIG. 4B.

FIGS. 6A-6C illustrate input devices, which may include through-body input devices, which detect signals through or within a human body or other structure, and external input devices, which detect signals outside a human body or other structure. In various embodiments, an input device that is characterized as a through-body input device may detect signals outside a user's body. Similarly, an input device that is characterized as an external input device may detect signals through or within a user's body. Furthermore, an input device that is characterized as either a through-body input device or external input device may be used to detect both types of signals. As noted above, a "through-body signal" as used herein refers to a signal propagating through or within a human body (e.g., a user's body).

Turning to FIG. 6A, the sealing component 622 may be used to form a sealed passage between various internal components of the wearable audio device 600A and the ear canal 684 of the user. FIG. 6A shows a sealed passage 630. In some embodiments, the sealed passage 630 extends between an interior volume of the enclosure 610 and the ear canal 684. In some embodiments, the sealed passage may allow the wearable audio device 600A to receive signals (e.g., signals corresponding to input actions) from the ear canal 684 and/or other parts of the user's body. For example, FIG. 6A shows an example path 634A of a signal traveling from the ear canal 684 and through the sealed passage 630. One or more input devices of the wearable audio device 600A may detect the signals that correspond to the input actions. A processing unit 612 disposed in the enclosure 610 of the wearable audio device 600A or another device may determine that the signal corresponds to the input action and perform one or more actions, such as initiating and/or changing outputs of the wearable audio device.

The sealed passage 630 may couple the ear canal 684 with one or more through-body input devices of the wearable audio device 600A. For example, FIG. 6A shows a through-body input device 690A operably coupled to the sealed passage 630, and thereby coupled to the ear canal 684. In various embodiments, the through-body input device 690A is coupled to the user's body by walls and structures of the ear canal 684.

The through-body input device 690A may receive signals from the ear canal 684 and/or other parts of the user's body. For example, the through-body input device 690A may receive signals that propagate through or within the ear canal 684, one or more other parts of the user's body, or some combination thereof. In various embodiments, the signals are inputs for the through-body input device 690A. In some embodiments, the through-body input device 690A includes a microphone that is configured to detect acoustic signals propagating through or within the ear canal 684, one or more other parts of the user's body, or some combination thereof.

For example, an input action corresponding to a user contacting his or her own body may cause an acoustic signal to propagate through or within the user's body, and a microphone coupled to the user's ear canal 684 or otherwise coupled to the user's body may detect this acoustic signal. The processing unit 612 of the wearable audio device 600A (or another processing unit of an associated electronic device) may analyze or otherwise process this signal to determine that it was generated by an input action. In other embodiments, the input device includes a vibration sensor and is configured to detect vibration signals propagating through or within the user's body, the ear canal 684, or some combination thereof. In still other embodiments, the through-body input device 690A includes another type of input device, such as those discussed above with respect to FIG. 1. In various embodiments, the wearable audio device 600A may include multiple through-body input devices.

The wearable audio device 600A may further include one or more external input devices for receiving signals outside the user's body. For example, external input device 691A is positioned in the enclosure 310 and is configured to detect signals propagating outside the user's body. In some embodiments, the external input device 691A includes a microphone that is configured to detect acoustic signals propagating outside the user's body. In some embodiments, the external input device 691A includes a camera that is configured to capture images external to a user's body. For example, a camera may be positioned such that it can capture images of the user contacting his or her body, such as contacting his or her head as shown in FIG. 5. The processing unit 612 of the wearable audio device 600A or another processing unit may perform image recognition on the captured images and determine that the captured images correspond to an input action.

In some embodiments, the external input device 691A includes an optical sensor that is configured to detect optical signals. In still other embodiments, the external input device 691A includes another type of input device, such as those discussed above with respect to FIG. 1. In various embodiments, the wearable audio device 600A may include multiple external input devices.

Additionally or alternatively, the sealed passage 630 may allow the wearable audio device 600A to transmit audio output into the ear canal 684, while mitigating or preventing the audio output from being released into a surrounding environment, as discussed above with respect to FIG. 4B. The sealed passage 630 may couple the ear canal 684 with one or more output devices of the wearable audio device 600A. For example, FIG. 6A shows an output device 692A operably coupled to the sealed passage 630, and thereby coupled to the ear canal 684. FIG. 6A shows an example path 635A of an acoustic signal generated by the wearable audio device 600 traveling through the sealed passage 630 and into the ear canal 684. This configuration may improve sound quality and also allow the sealing component 622 to block ambient noises or other environmental containments from entering the ear canal 684. In various embodiments, the audio outputs provided by the output device 692A are provided and/or modified in response to inputs received by the through-body input device 690A and/or the external input device 691A.

FIG. 6A illustrates the input device 690A coupled to the user's body through the ear canal 684. In various embodiments, the input device 690A may be coupled to the user's body in other ways. For example, FIG. 6B illustrates an input device 690B coupled to a user's body. The sealing component 622 may be used to form a sealed passage 632 between various internal components of the wearable audio device 600B and a portion 686 of the user's body. In some embodiments, the sealed passage 632 extends between an interior volume 611 of the enclosure 610 and the portion 686 of the user's body. In some embodiments, the sealed passage may allow the wearable audio device 600B to receive signals (e.g., signals corresponding to input actions) from the user's body, such as signals propagating through or within the user's body. For example, FIG. 6B shows an example path 634B of a signal traveling from the portion 686 of the user's body and through the sealed passage 632.

The sealed passage 632 may couple the user's body (e.g., a structure) with one or more input devices of the wearable audio device 600B. For example, FIG. 6B shows an input device 690B operably coupled to the sealed passage 632, and thereby coupled to the user's body. In various embodiments, the input device 690B is coupled to the ear canal 684 through or within the user's body. The input device 690B may receive signals from propagating through the ear canal 684 and/or other parts of the user's body. For example, the input device 690B may receive signals that propagate through or within the ear canal 684, one or more other parts of the user's body, or some combination thereof. In various embodiments, the wearable audio device 600B may include various components described with respect to the other wearable audio devices herein, including a sealed passage similar to sealed passage 630 in addition to the sealed passage 632.

FIGS. 6A and 6B show the input device 690A coupled to the ear canal 684 using multiple sealed passages 630, 632. In various embodiments, the input devices may be coupled to the ear canal 684 and/or other parts of the user's body in a variety of ways. For example, FIG. 6C illustrates input devices 690C, 690D disposed near a distal end 650 of the sealing component 622. The input device 690C is positioned such that it is coupled to the ear canal 684. In some embodiments, the input device 690B is directly coupled to the ear canal 684 such that the input device may detect signals propagating through the ear canal 684, the user's body, or some combination thereof. In various embodiments, the input device 690C is coupled to the user's body through the ear canal 684. The input device 690C may receive signals from the ear canal 684 and/or other parts of the user's body.

The input device 690D is positioned such that it is coupled to a portion 686 of the body of the user. In some embodiments, the input device 690B is directly coupled to the body of the user such that the input device may detect signals propagating through the body. In various embodiments, the input device 690D is coupled to the ear canal 684 through or within the user's body. The input device 690D may receive signals from the ear canal 684 and/or other parts of the user's body. The input devices 690C and 690D may be operably coupled to additional components of the wearable audio device 600C by a wired or wireless connector, for example.

In another embodiment, the input device(s) 690C, 690D may include multiple components disposed at multiple locations of the wearable audio device 600. For example, an input device may include a sensing element disposed at a distal end of the sealing component (similar to the input devices 690C and 609D of FIG. 6C) and a processing element disposed within the interior volume 611 (similar to the input devices 690A and 690B of FIGS. 6A and 6B). The components of the input devices may be operably coupled to each other and/or additional components of the wearable audio device either wiredly or wirelessly.

In some instances, an input action may cause multiple signals to propagate through or within the user's body, outside the user's body, and/or some combination thereof. In some embodiments, an input device may detect multiple signals generated by an input action. For example, a through-body input device may detect multiple vibration or acoustic signals generated by an input action. As another example, an external input device may detect multiple acoustic, image, or optical signals generated by an input action. In embodiments with multiple input devices, each input device may detect all or a subset of the signals generated by an input action. For example, an external input device may detect one or more acoustic, image, and/or optical signals generated by an input action and a through-body input device may detect one or more acoustic or vibration signals corresponding to the same input action.

In some embodiments, multiple input devices from a wearable audio device detect one or more signals generated by an input action. For example, multiple input devices that include any combination of through-body input devices and/or external input devices may detect a signal caused by an input action.

In some embodiments, multiple input devices disposed in two or more wearable audio devices may detect one or more signals generated by an input action. For example, a user may have a first wearable audio device disposed in a first ear and a second wearable audio device disposed in a second ear (e.g., wearable audio devices 200a and 200b of FIG. 2). An input device of a wearable audio device disposed in a first ear and an input device of a wearable audio device disposed in a second ear may each detect a signal generated by an input action. The input devices may detect the same signal, different signals, and/or multiple signals.

In various embodiments in which multiple input devices detect one or more signals generated by an input action and/or a single input device detects multiple signals generated by an input action, a processing device of the wearable audio device (e.g., processing device 150 of FIG. 1) may analyze or otherwise process the signals to determine that they correspond to the input action. In some embodiments, the processing unit may determine that a first signal was generated by an input action and may analyze one or more additional signals to confirm or reject the finding that the first signal corresponds to the input action.

Multiple detected signals and/or a signal detected by multiple input devices may be used to determine additional information about an input action. In some embodiments, the processing unit may determine an estimated location of an input action by analyzing differences between a signal received at multiple input devices. For example, the processing unit may determine a time delay between a time a signal is received at a first input device and a time the signal is received at a second input device and determine an estimated location of the input action based on the time delay. In embodiments in which signals detected by multiple wearable audio devices are processed, the signals may be processed at one or more of the multiple wearable audio devices and/or a connected device, as discussed in more detail below with respect to FIG. 8.

Figure 7:
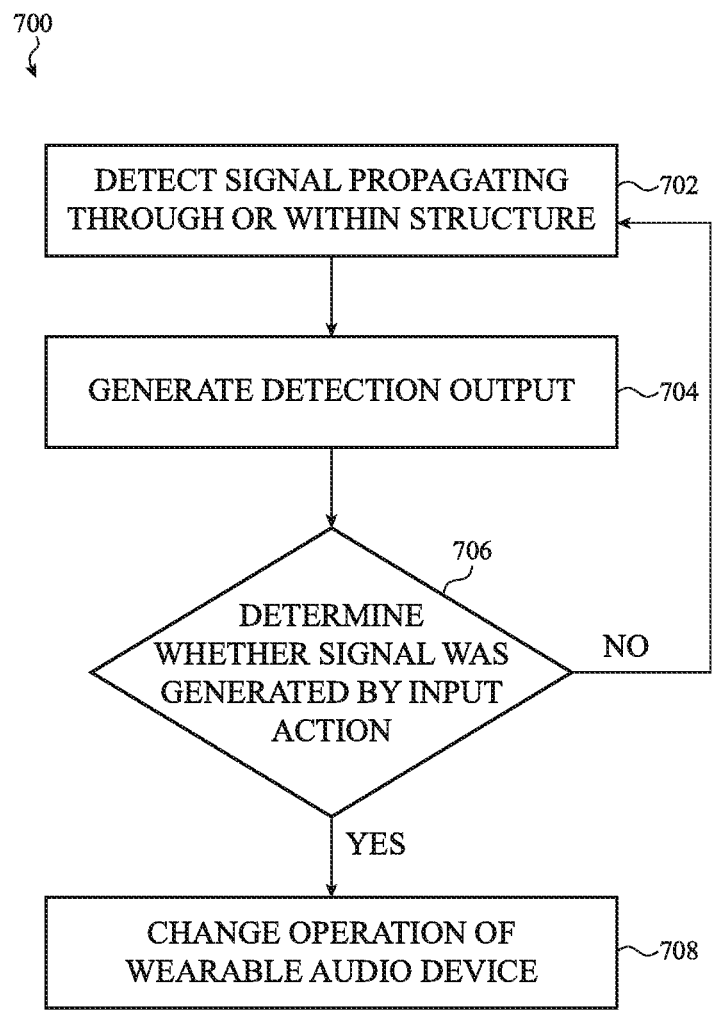
FIG. 7 illustrates an example process for changing the operation of a wearable audio device in response to receiving a signal generated by an input action.

FIG. 7 illustrates an example process 700 for changing the operation of a wearable audio device in response to receiving a signal generated by an input action. The wearable audio device may be any of the wearable audio devices described herein, and may be disposed in an ear of a user or another structure as described above. The wearable audio device may include a processing unit, which may have features and components similar to any of the processing units described herein. The processing unit may be disposed in the wearable audio device, in another wearable audio device, or in a separate computing device (e.g., a companion device as described herein). The wearable audio device may include an input device, which may have features and components similar to any of the input devices described herein.

At operation 702, the input device detects a signal propagating through or within the structure. At operation 704, the input device generates a detection output in response to detecting the signal. The processing unit receives the detection output. In operation 706, the processing unit determines, based on the detection output, whether the signal was generated by an input action at the structure. Determining whether the signal was generated by an input action may include analyzing the detection output in a variety of ways, including signal recognition (e.g., audio fingerprinting, image recognition, machine learning, and so on).

If the processing unit determines that the signal was generated by an input action at the structure, the process proceeds to operation 708. If the processing unit does not determine that the signal was generated by an input action at the structure, the process may return to step 702. In some embodiments, if the processing unit cannot determine whether the signal was generated by an input action at the structure or not, the processing unit may analyze one or more additional signals to make a determination. For example, the processing unit may analyze one or more detection outputs from other input devices and/or one or more different signals from the same input device to determine whether the detection outputs correspond to signals generated by an input action.

At operation 708, the processing unit changes the operation of the wearable audio device in accordance with the input action. Changing the operation of the wearable audio device may include modifying, initiating, and/or ceasing one or more outputs of the wearable audio device, executing functions on the wearable audio device, or the like. For example, an audio output of the wearable audio device may change from a first mode to a second mode in response to detecting a signal that was generated by an input action. Modes of the audio output may correspond to different types of audio output (e.g., phone calls, music, and the like), different tracks (e.g., songs), different volume levels, and the like.

As discussed above, different input actions may correspond to different changes at the wearable audio device. The mappings of input actions to changes may be stored at the wearable audio device and/or a companion device and may be user-editable.

Figure 8:
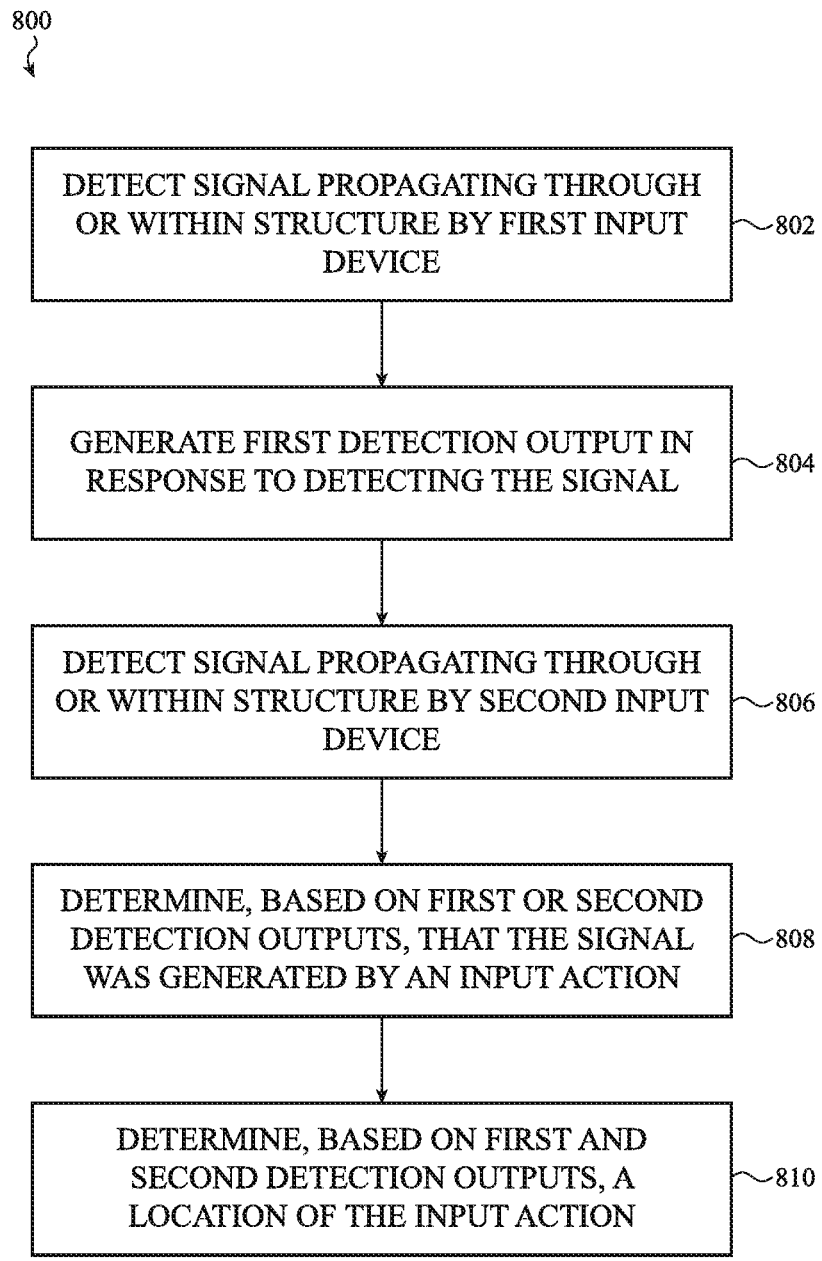
FIG. 8 illustrates an example process for determining an estimated location of an input action based on signals received by multiple input devices.

FIG. 8 illustrates an example process 800 for determining an estimated location of an input action based on signals received by multiple input devices. The input devices may be disposed in one or more wearable audio devices and may have features and components similar to any of the input devices described herein. Each of the one or more wearable audio devices may be any of the wearable audio devices described herein, and may be disposed in an ear of a user or another structure as described above. In one embodiment, each of two wearable audio devices are disposed in a different ear of a user. The wearable audio devices may include a processing unit, which may have features and components similar to any of the processing units described herein. In operation 802, a first input device detects a signal propagating through or within a structure. In operation 804, the first input device generates a first detection output in response to detecting the signal. A processing unit receives the first detection output. In operation 806, a second input device detects the signal propagating through or within the structure. In operation 808, the second input device generates a second detection output in response to detecting the signal. A processing unit receives the second detection output. In some embodiments, the processing unit that receives the first detection output is the same processing unit that receives the second detection output. For example, if the first input device is disposed in a first wearable audio device and the second input device is disposed in a second wearable audio device, the processing unit may be disposed in the first wearable audio device, the second wearable audio device, or in a companion audio device, and the input devices may be configured to directly transmit the detection outputs to the processing unit. In some embodiments, the processing unit that receives the first detection output is different from the processing unit that receives the second detection output. For example, if the first input device is disposed in a first wearable audio device and the second input device is disposed in a second wearable audio device, a first processing unit may be disposed in the first wearable audio device, and a second processing unit may be disposed in the second wearable audio device. In these embodiments, the different processing units may process the detection outputs separately. Alternatively, one of the processing units may transmit the detection output to the other processing unit so that both detection outputs may be processed by the same processing unit.

In operation 810, the processing unit(s) determine, based on the first and/or second detection outputs, that the signal was generated by an input action on an external surface of the structure. At operation 812, the processing unit(s) determine, based on the first and second outputs, an estimated location of the input action. For example, if the input action is a tap on a user's face, the processing unit(s) may determine an approximate location of the tap. In some embodiments, the processing unit may determine an estimated location of an input action by analyzing differences between a signal received at multiple input devices. For example, the processing unit may determine a time delay between a time a signal is received at a first input device and a time the signal is received at a second input device and determine an estimated location of the input action based on the time delay. In some embodiments, determining the location includes determining a side of the head that the input action occurred. Input actions at different locations may correspond to different operations at the wearable audio devices.

In embodiments in which one or more signals detected by multiple wearable audio devices are processed, the signals may be processed at one or more of the multiple wearable audio devices and/or a connected device. As described above, the wearable audio devices may include a communication device configured to communicate with one or more additional devices, including other wearable audio devices. In one embodiment, the signals (or outputs from components of the wearable audio device that correspond to the signals) are transmitted to a processing unit of one of the multiple wearable audio devices or another device. The processing unit may analyze the signals or outputs and determine whether they correspond to an input action and/or whether outputs and/or functions of any of the wearable audio devices should be changed or executed in response to the signal or output. The device where the processing occurs may transmit instructions to the other wearable audio devices to adjust their output or function.

Figure 9:
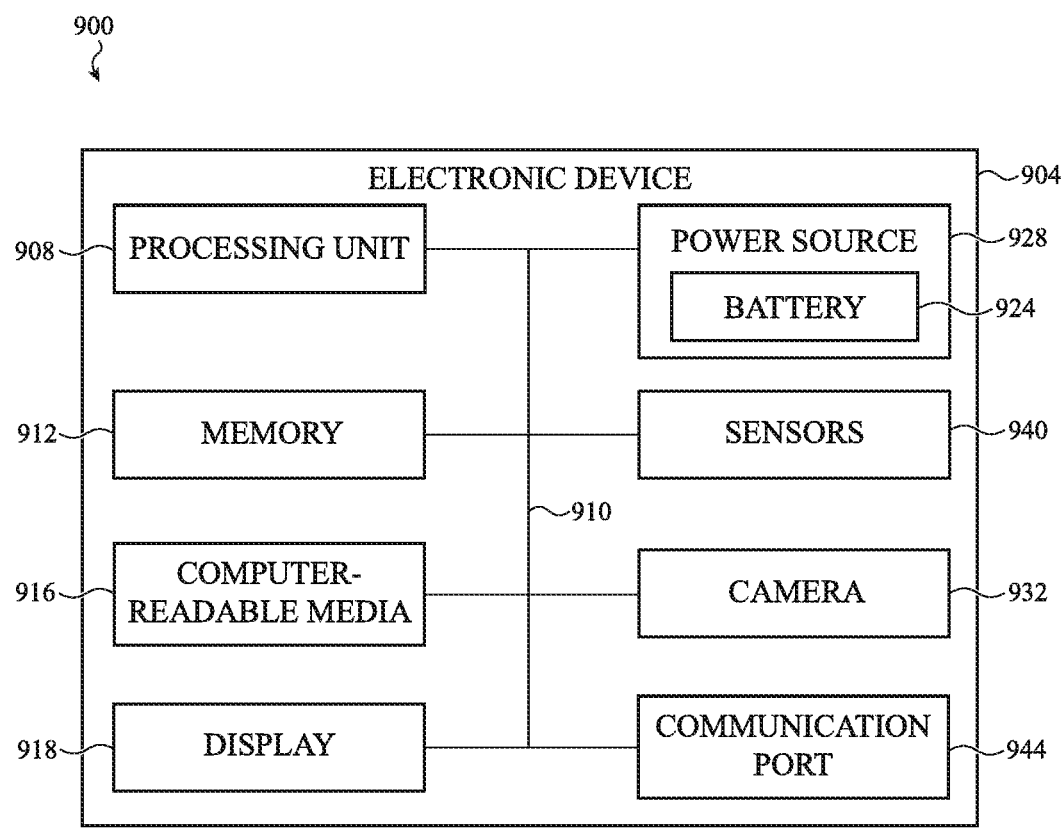
FIG. 9 depicts a functional block diagram of an electronic device.

FIG. 9 is a functional block diagram of an electronic device 900, such as the electronic device 100 described with respect to FIG. 1 and other figures herein. It will be appreciated, however, that the functional block diagram described herein of electronic device 900 may include components substantially analogous to components of other electronic devices or the like described herein. In this regard, the schematic representation in FIG. 9 may correspond to the electronic device depicted in FIG. 1, described above. However, the schematic representation in FIG. 9 may also correspond to the other electronic devices or the like described herein, such as a companion device. The electronic device 900 may include any appropriate hardware (e.g., computing devices, data centers, switches), software (e.g., applications, system programs, engines), network components (e.g., communication paths, interfaces, routers), and the like (not necessarily shown in the interest of clarity) for use in facilitating any appropriate operations disclosed herein.

As shown in FIG. 9, the electronic device 900 may include a processing unit or element 908 operatively connected to computer memory 912 and computer-readable media 916. The processing unit 908 may be operatively connected to the memory 912 and computer-readable media 916 components via an electronic bus or bridge (e.g., such as system bus 910). The processing unit 908 may include one or more computer processors or microcontrollers that are configured to perform operations in response to computer-readable instructions. The processing unit 908 may be a central processing unit. Additionally or alternatively, the processing unit 908 may be other processors within the device including application specific integrated chips (ASIC) and other microcontroller devices.

The memory 912 may include a variety of types of non-transitory computer-readable storage media, including, for example, read access memory (RAM), read-only memory (ROM), erasable programmable memory (e.g., EPROM and EEPROM), or flash memory. The memory 912 is configured to store computer-readable instructions, sensor values, and other persistent software elements. Computer-readable media 916 may also include a variety of types of non-transitory computer-readable storage media, including, for example, a hard-drive storage device, a solid-state storage device, a portable magnetic storage device, or other similar device. The computer-readable media 916 may also be configured to store computer-readable instructions, sensor values, and other persistent software elements.

In this example, the processing unit 908 is operable to read computer-readable instructions stored on the memory 912 and/or computer-readable media 916. The computer-readable instructions may adapt the processing unit 908 to perform the operations or functions described above with respect to FIGS. 1-9. The computer-readable instructions may be provided as a computer-program product, software application, or the like.

As shown in FIG. 9, the electronic device 900 may also include a display 918. The display 918 may include a liquid-crystal display (LCD), organic light emitting diode (OLED) display, light emitting diode (LED) display, or the like. If the display 918 is an LCD, the display may also include a backlight component that can be controlled to provide variable levels of display brightness. If the display 918 is an OLED or LED type display, the brightness of the display 918 may be controlled by modifying the electrical signals that are provided to display elements.

The electronic device 900 may also include a battery 924 that is configured to provide electrical power to the components of the electronic device 900. The battery 924 may include one or more power storage cells that are linked together to provide an internal supply of electrical power. In this regard, the battery 924 may be a component of a power source 928 (e.g., including a charging system or other circuitry that supplies electrical power to components of the electronic device 900). The battery 924 may be operatively coupled to power management circuitry that is configured to provide appropriate voltage and power levels for individual components or groups of components within the electronic device 900. The battery 924, via power management circuitry, may be configured to receive power from an external source, such as an AC power outlet or interconnected computing device. The battery 924 may store received power so that the electronic device 900 may operate without connection to an external power source for an extended period of time, which may range from several hours to several days.

The electronic device 900 may also include one or more sensors 940 that may be used to detect a touch and/or force input, environmental condition, orientation, position, or some other aspect of the electronic device 900. For example, sensors 940 that may be included in the electronic device 900 may include, without limitation, one or more accelerometers, gyrometers, inclinometers, or magnetometers. The sensors 940 may also include one or more proximity sensors, such as a magnetic hall-effect sensor, inductive sensor, capacitive sensor, continuity sensor, or the like.

The sensors 940 may also be broadly defined to include wireless positioning devices including, without limitation, global positioning system (GPS) circuitry, Wi-Fi circuitry, cellular communication circuitry, and the like. The electronic device 900 may also include one or more optical sensors, including, without limitation, photodetectors, photo sensors, image sensors, infrared sensors, or the like. In one example, the sensor 940 may be an image sensor that detects a degree to which an ambient image matches a stored image. As such, the sensor 940 may be used to identify a user of the electronic device 900. The sensors 940 may also include one or more acoustic elements, such as a microphone used alone or in combination with a speaker element. The sensors 940 may also include a temperature sensor, barometer, pressure sensor, altimeter, moisture sensor or other similar environmental sensor. The sensors 940 may also include a light sensor that detects an ambient light condition of the electronic device 900.

The sensor 940, either alone or in combination, may generally be a motion sensor that is configured to estimate an orientation, position, and/or movement of the electronic device 900. For example, the sensor 940 may include one or more motion sensors, including, for example, one or more accelerometers, gyrometers, magnetometers, optical sensors, or the like to detect motion. The sensors 940 may also be configured to estimate one or more environmental conditions, such as temperature, air pressure, humidity, and so on. The sensors 940, either alone or in combination with other input, may be configured to estimate a property of a supporting surface, including, without limitation, a material property, surface property, friction property, or the like.

The electronic device 900 may also include a camera 932 that is configured to capture a digital image or other optical data. The camera 932 may include a charge-coupled device, complementary metal oxide (CMOS) device, or other device configured to convert light into electrical signals. The camera 932 may also include one or more light sources, such as a strobe, flash, or other light-emitting device. As discussed above, the camera 932 may be generally categorized as a sensor for detecting optical conditions and/or objects in the proximity of the electronic device 900. However, the camera 932 may also be used to create photorealistic images that may be stored in an electronic format, such as JPG, GIF, TIFF, PNG, raw image file, or other similar file types.

The electronic device 900 may also include a communication port 944 that is configured to transmit and/or receive signals or electrical communication from an external or separate device. The communication port 944 may be configured to couple to an external device via a cable, adaptor, or other type of electrical connector. In some embodiments, the communication port 944 may be used to couple the electronic device 900 with a computing device and/or other appropriate accessories configured to send and/or receive electrical signals. The communication port 944 may be configured to receive identifying information from an external accessory, which may be used to determine a mounting or support configuration. For example, the communication port 944 may be used to determine that the electronic device 900 is coupled to a mounting accessory, such as a particular type of stand or support structure.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A wearable audio device, comprising:
   an enclosure;
   a sealing component coupled to the enclosure and configured to engage an ear of a user, thereby forming a sealed passage between an ear canal of the ear and the enclosure;
   a vibration sensor disposed in the enclosure and configured to:
      detect, at the ear of the user, a first vibration transmitted from a first region of a head of the user other than the ear, through the head of the user and to the ear;
      provide a first detection output in response to detecting the first vibration;
      detect, at the ear of the user, a second vibration transmitted from a second region of the head of the user other than the ear, through the head of the user and to the ear; and
      provide a second detection output in response to detecting the second vibration;
   an audio output device acoustically coupled to the ear canal by the sealed passage and configured to provide an audio output; and
   a processing unit operably coupled to the vibration sensor and the audio output device and configured to:
      receive the first detection output and the second detection output from the vibration sensor;
      determine that the first vibration was generated by a first gesture input received at the first region;
      in response to determining that the first vibration was generated by the first gesture input, adjust the audio output in accordance with the first gesture input;
      determine that the second vibration was generated by a second gesture input, different from the first gesture input, received at the second region; and
      in response to determining that the second vibration was generated by the second gesture input, adjust the audio output in accordance with the second gesture input.

2. The wearable audio device of claim 1, wherein:
   the sealing component is disposed around at least a portion of the enclosure and formed of an elastically deformable material;
   the audio output device is disposed in the enclosure; and
   the processing unit is disposed in the enclosure.

3. The wearable audio device of claim 1, wherein the sealing component is disposed around at least a portion of the enclosure and formed of an elastically deformable material.

4. The wearable audio device of claim 1, wherein:
   the wearable audio device further comprises an input device disposed in the enclosure and configured to:
      detect an acoustic signal propagating outside a body of the user; and
      provide a third detection output in response to detecting the acoustic signal.

5. The wearable audio device of claim 4, wherein:
   the processing unit is further configured to determine that the acoustic signal was generated by the first input gesture.

6. A method for receiving inputs at a wearable audio device, comprising:

detecting, by a first input device of the wearable audio device positioned at a first location in an outer ear of a user, a vibration propagating through a body of the user;

detecting, by a second input device of the wearable audio device, an acoustic signal propagating outside the body of the user;

determining, by a processing unit of the wearable audio device, that the vibration and the acoustic signal were generated by an input action on a head of the user at a second location different from the first location; and in response to determining that the vibration and the acoustic signal were generated by the input action, adjusting an output of the wearable audio device in accordance with the input action.

7. The method of claim 6, wherein the input action is at least one of tapping on the head of the user or swiping on the head of the user.

8. The method of claim 6, wherein:
the output of the wearable audio device is an audio output;
the input action is a tap on the head of the user; and
adjusting the audio output comprises pausing the audio output.

9. The method of claim 6, wherein:
the output of the wearable audio device is an audio output;
the input action is a swipe on the head of the user; and
adjusting the audio output comprises at least one of increasing or decreasing a volume of the audio output.

10. A system for receiving electronic device inputs, comprising:
a first input device positioned at a first location and configured to provide a first detection output in response to detecting a signal propagating through a human body;
a second input device positioned at a second location and configured to provide a second detection output in response to detecting the signal propagating through the human body;
a processing unit operably coupled to the first and second input devices and configured to:
analyze the first and second detection outputs to determine that the signal was generated by an input action received on the human body at a third location different from the first location and the second location; and
determine a time delay between a first time the signal is detected at the first input device and a second time the signal is detected at the second input device; and
determine an estimated location of the input action based on the time delay; and
an audio output device operably coupled to the processing unit and configured to provide an audio output, wherein:
the processing unit is further configured to adjust the audio output in accordance with the estimated location of the input action.

11. The system of claim 10, wherein:
the first input device, the processing unit, and the audio output device are disposed in a first wearable audio device; and
the second input device is disposed in a second wearable audio device.

12. The system of claim 11, wherein:
the first wearable audio device is disposed in a first ear of a user;
the second wearable audio device is disposed in a second ear of the user; and
the third location is on or near a head of the user.

13. The system of claim 12, wherein:
the first input device is coupled to a first ear canal of the first ear; and
the second input device is coupled to a second ear canal of the second ear.

14. The system of claim 10, wherein the first input device comprises one of:
an audio input device configured to detect an acoustic signal propagating through the human body; or
a vibration sensor configured to detect a vibration signal propagating through the human body.

15. The system of claim 10, wherein:
the signal is a first signal; and
the system further comprises a third input device comprising at least one of and optical sensor or a camera, the third input device configured to provide a third detection output in response to detecting a second signal propagating outside the human body; and
the processing unit is further configured to:
analyze the third detection output to determine that the second signal was generated by the input action; and
determine the estimated location of the input action based at least in part on the third detection output.

* * * * *